US006769404B2

(12) United States Patent
Aoyama et al.

(10) Patent No.: US 6,769,404 B2
(45) Date of Patent: Aug. 3, 2004

(54) COMBUSTION CONTROL SYSTEM FOR SPARK-IGNITION INTERNAL COMBUSTION ENGINE WITH VARIABLE PISTON STRIKE CHARACTERISTIC MECHANISM AND VARIABLE VALVE OPERATING MECHANISM

(75) Inventors: Shunichi Aoyama, Kanagawa (JP); Katsuya Moteki, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 27 days.

(21) Appl. No.: 10/042,388

(22) Filed: Jan. 11, 2002

(65) Prior Publication Data

US 2002/0092488 A1 Jul. 18, 2002

(30) Foreign Application Priority Data

Jan. 16, 2001 (JP) .................................. 2001-007385
Dec. 21, 2001 (JP) .................................. 2001-388951

(51) Int. Cl.$^7$ ................................. F02B 75/04; F02P 5/152
(52) U.S. Cl. ............................... 123/406.29; 123/78 F; 123/90.16
(58) Field of Search .................. 123/406.29, 90.16, 123/48 B, 78 BA, 78 E, 78 F, 90.15, 90.17, 90.18

(56) References Cited

U.S. PATENT DOCUMENTS

| 4,917,066 | A | * | 4/1990 | Freudenstein et al. | .... 123/48 B |
| 5,255,637 | A | * | 10/1993 | Schechter | ................ 123/90.15 |
| 5,572,959 | A | * | 11/1996 | Hedelin | .................... 123/90.15 |
| 5,908,018 | A | | 6/1999 | Suzuki | |
| 5,988,125 | A | | 11/1999 | Hara et al. | ............... 123/90.16 |
| 6,125,801 | A | * | 10/2000 | Mendler | ................... 123/90.15 |
| 6,202,623 | B1 | * | 3/2001 | Ehrlich | ...................... 123/78 E |
| 6,209,516 | B1 | * | 4/2001 | Yamashita | ............... 123/90.15 |
| 6,289,857 | B1 | * | 9/2001 | Boggs | ...................... 123/78 E |
| 6,308,670 | B1 | * | 10/2001 | Hammoud et al. | ...... 123/90.15 |
| 6,394,048 | B1 | * | 5/2002 | Styron | ...................... 123/48 B |

FOREIGN PATENT DOCUMENTS

| EP | 0 568 214 | 11/1993 |
| JP | 8-338295 | 12/1996 |
| JP | 11-36906 | 2/1999 |
| JP | 11-107725 | 4/1999 |

OTHER PUBLICATIONS

Patent Abstracts of Japan, vol. 012, No. 371 (M–748), Oct. 5, 1988 & JP 63 120820 A (Toyota Motor Corp.), May 25, 1988.
Patent Abstracts of Japan, vol. 016, No. 467 (M–1317), Sep. 29, 1992 & JP 04 166624 A (Mitsubishi Motors Corp.), Jun. 12, 1992.
Patent Abstracts of Japan, vol. 1998, No. 01, Jan. 30, 1998 & JP 09 228858 A (Hondou Jutaku KK), Sep. 2, 1997.
Patent Abstracts of Japan, vol. 1998, No. 05, Apr. 30, 1998 & JP 10 009005 A (Nippon Soken Inc.), Jan. 13, 1998.
Bollig et al., "Kurbeltrieb für Variable Verdichtung", MTZ Motortechnische Zeitschrift, vol. 58, 1997, pp. 706–711.

* cited by examiner

Primary Examiner—Erick Solis
(74) Attorney, Agent, or Firm—Foley & Lardner LLP

(57) ABSTRACT

A combustion control system for a spark-ignition internal combustion engine includes a variable piston stroke characteristic mechanism changing a compression ratio of the engine, sensors detecting engine operating conditions, i.e., engine speed and engine load, and at least one of a variable lift and working-angle control mechanism simultaneously continuously changing an intake-valve lift and an intake-valve working angle and a variable phase control mechanism changing an angular phase at a central angle corresponding to a maximum valve lift point of the intake valve. Also provided is a control unit that controls the variable piston stroke characteristic mechanism, and at least one of the variable lift and working-angle control mechanism and the variable phase control mechanism, depending on the engine operating conditions.

19 Claims, 13 Drawing Sheets

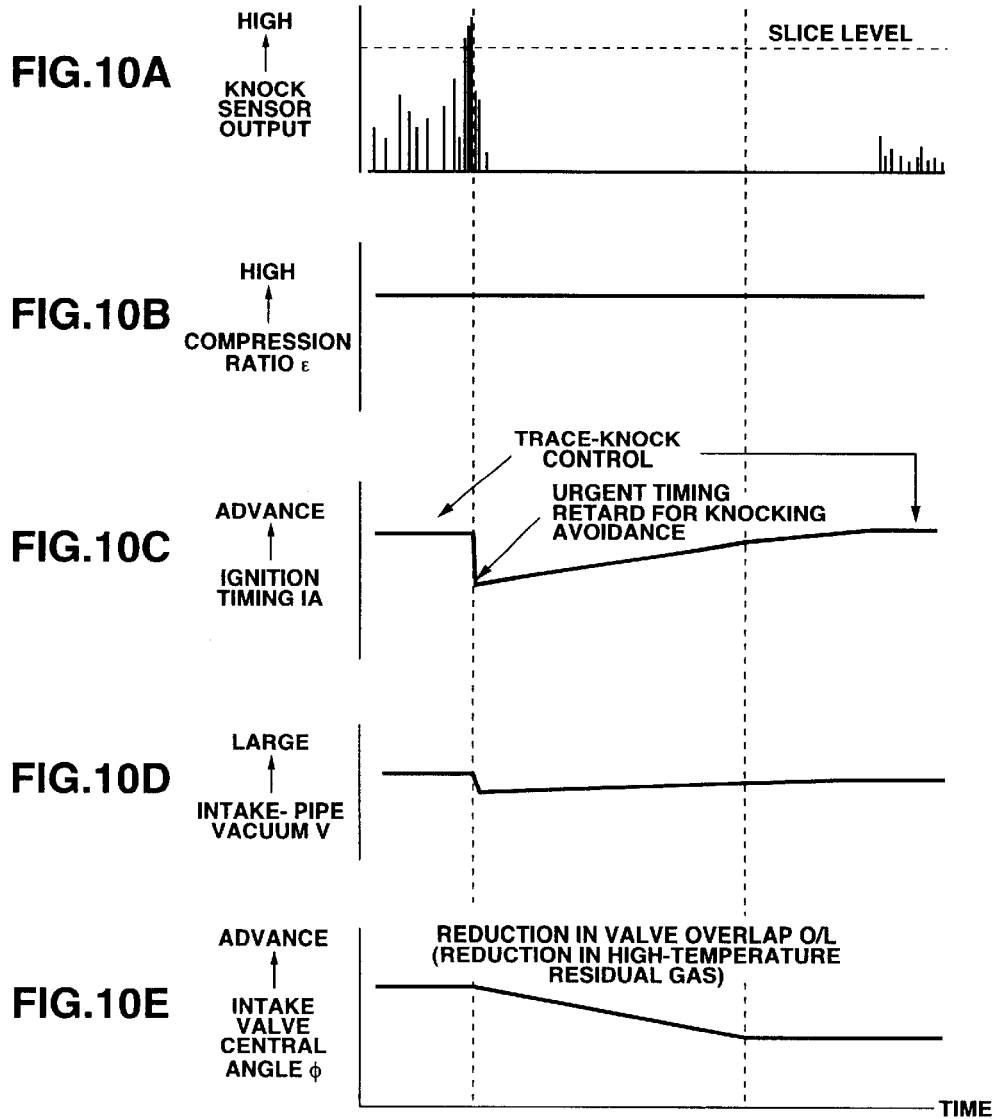

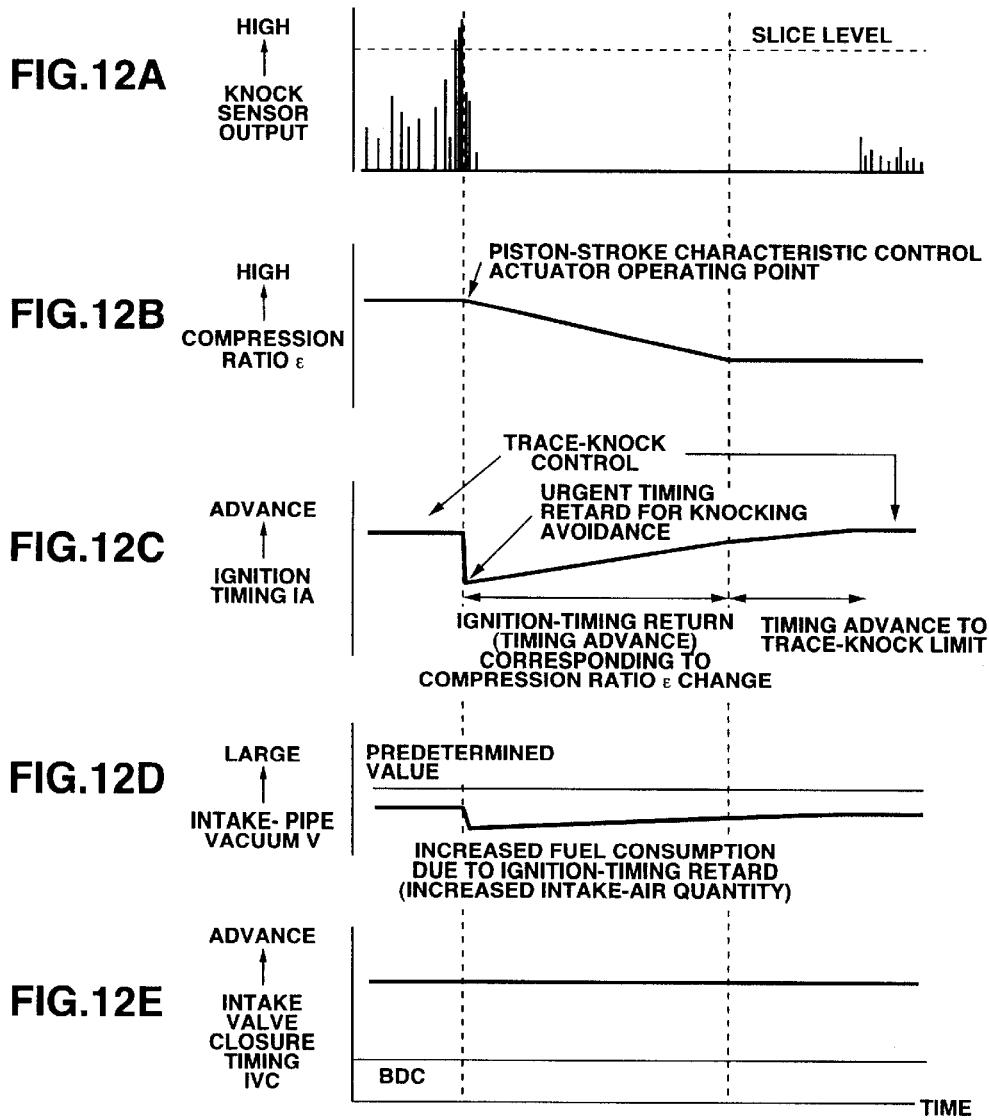

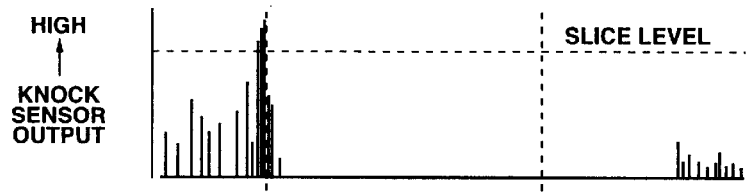
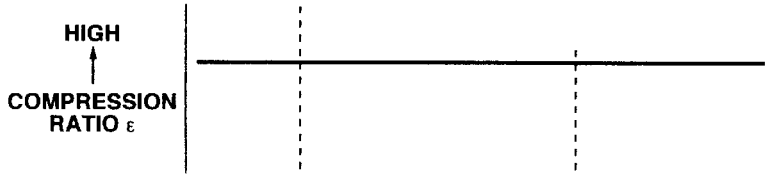
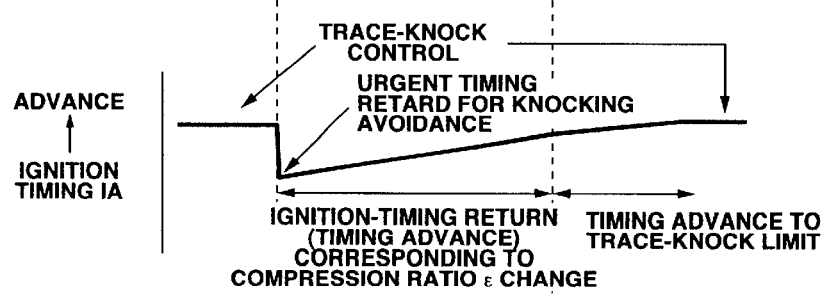
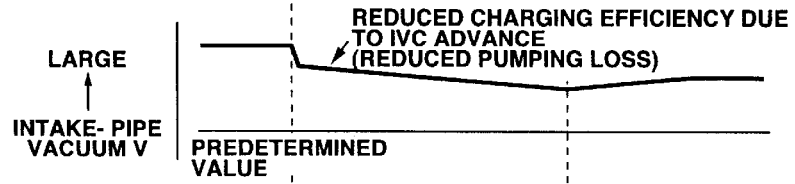
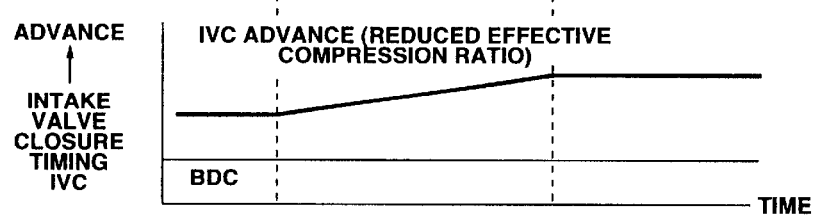

COMBUSTION CONTROL SYSTEM FOR SPARK-IGNITION INTERNAL COMBUSTION ENGINE WITH VARIABLE PISTON STRIKE CHARACTERISTIC MECHANISM AND VARIABLE VALVE OPERATING MECHANISM

TECHNICAL FIELD

The present invention relates to a combustion control system for a spark-ignition internal combustion engine employing a variable piston stroke characteristic mechanism (a variable compression ratio mechanism capable of varying a compression ratio $\epsilon$) and a variable valve operating mechanism capable of varying a valve lift characteristic (a valve lift, a working angle, a phase of a central angle of the working angle) of an intake valve.

BACKGROUND ART

A compression ratio often denoted by Greek letter $\epsilon$ (epsilon) is generally defined as a ratio $(V_1+V_2)/V_1$ of the full volume $(V_1+V_2)$ existing within the engine cylinder and combustion chamber with the piston at bottom dead center (BDC) to the clearance-space volume $(V_1)$ with the piston at top dead center (TDC). On the other hand, an effective compression ratio denoted by $\epsilon'$ is generally defined as a ratio of the effective cylinder volume corresponding to the maximum working medium volume to the effective clearance volume corresponding to the minimum working medium volume. These two compression ratios $\epsilon$ and $\epsilon'$ are thermodynamically distinguished from each other. A compression ratio is one of basic parameters for enhanced thermal efficiency. In fixed compression-ratio spark-ignition internal combustion engines, compression ratio $\epsilon$ is set to as high a ratio as possible, taking into account the frequency of detonation or knock. There are several options to avoid such fixed compression-ratio engines from knocking. One way to avoid a combustion chamber knock condition is to simply retard ignition-spark timing, when combustion knock occurs in the engine. Another way to avoid knocking is to vary intake-valve operating characteristics, thereby varying effective compression ratio $\epsilon'$. Moreover, a variable compression ratio device can be added as an antiknock means. In designing combustion control systems, it is important to balance two contradictory requirements, that is, high thermal efficiency and high-response knock control. As is generally known, there is an increased tendency for combustion knock to occur at severe engine operating conditions, such as at high-temperature high-load operation. Knocking occurs under certain conditions wherein the temperature of intake air introduced into the engine cylinder goes high enough owing to heat of compression and heat exchange between the intake air and the cylinder wall and piston, and the last part of compressed air-fuel mixture or end gas explodes suddenly or self-ignites before flame propagation is completed and thus the combustion velocity increases, thereby creating knocking noise and higher thermal and mechanical stresses on internal combustion engine components. As discussed above, engine knock tends to occur owing to a temperature rise in the compressed air fuel mixture. There is an increased tendency for knocking to occur, in particular when the engine coolant temperature rises during continuous high-load operation. Setting compression ratio $\epsilon$ to a low value contributes to knocking avoidance, but results in reduced thermal efficiency, that is, deteriorated fuel economy. In recent years, fixed spark-ignition compression-ratio engines usually employ a knock sensor or a detonation sensor in order to detect cylinder ignition knock and retard the ignition spark-timing, to avoid engine knock while setting compression ratio $\epsilon$ to a relatively high value. Ignition-timing retardation, by way of which a relatively high knocking control response can be attained, is suitable for knocking avoidance. However, ignition-timing retardation deteriorates fuel economy and results in an exhaust-temperature rise. This deteriorates the durability of an exhaust-system catalytic converter. For knocking avoidance, ignition-timing retardation can be combined with variable phase control. In case of the integrated knocking-avoidance control based on both ignition-timing retardation and variable phase control, under a condition that there is an increased tendency for the engine to knock, effective compression ratio $\epsilon'$ is lowered by retarding the phase of the camshaft (in other words, by retarding the intake valve closure timing often abbreviated to "IVC"), and as a result the charging efficiency and the temperature of air-fuel mixture on compression stroke can be decreased, thereby preventing an exhaust-temperature rise. One such knocking-avoidance system has been disclosed in Japanese Patent Provisional Publication No. 8-338295. Japanese Patent Provisional Publication No. 11-36906 has disclosed a knocking-avoidance system capable of variably controlling a working angle of an intake valve. For improved fuel economy, an integrated control based on both the variable working-angle control and the variable phase control has been proposed. A variable piston stroke characteristic mechanism, which is capable of variably adjusting a compression ratio $\epsilon$ by varying at least one of a TDC position and a BDC position, has been disclosed in pages 706-711 of the issue for 1997 of the paper "MTZ Motortechnische Zeitschrift 58, No. 11".

SUMMARY OF THE INVENTION

The variable piston stroke characteristic mechanism or the variable compression ratio mechanism is effective to avoid engine knock. However, the variable piston stroke characteristic mechanism is inferior to the ignition-timing control in control response. To enhance the control response, the variable piston stroke characteristic mechanism requires a comparatively large-size actuator having a large torque capacity. In contrast to the above, with compression ratio $\epsilon$ kept constant, it is possible to reduce the pumping loss by lowering effective compression ratio $\epsilon'$ by way of the intake valve closure timing (IVC) control, for improved fuel economy. In general, the ignition-timing control is superior to a so-called valve operating control containing variable intake-valve working-angle control and variable phase control, in control response for knocking avoidance. The valve operating control is superior to the variable piston stroke characteristic control, in knocking-avoidance control response. Under a particular condition where a comparatively high knocking-avoidance control response is required, such as during rapid acceleration, it is desirable to properly combine the IVC control having a relatively high control response with the other control. In the case that high engine output torque is required, the quantity of intake air has to be increased. However, the increased intake-air quantity is not always reconciled to a drop in effective compression ratio $\epsilon'$. The IVC control has to be utilized suitably depending on engine/vehicle operating conditions, from the viewpoint of the correlation of knocking avoidance with improved fuel economy and enhanced driveability.

Accordingly, it is an object of the invention to provide a combustion control system for a spark-ignition internal combustion engine with a variable piston stroke characteristic mechanism and at least one of a variable valve lift and working angle control mechanism and a variable phase control mechanism, which avoids the aforementioned disadvantages.

It is another object of the invention to provide an integrated combustion control system for a spark-ignition internal combustion engine with a variable piston stroke characteristic mechanism and at least one of a variable valve lift and working angle control mechanism and a variable phase control mechanism, which is capable of setting a compression ratio and operating conditions of an intake valve optimally depending upon engine/vehicle operating conditions, and of balancing a plurality of requirements, that is, knocking avoidance, improved fuel economy, and enhanced driveability by way of integrated control based on an operating mode selected from a variable piston-stroke characteristic control mode (or a variable compression-ratio control mode), a variable intake-valve working-angle control mode, and a variable intake-valve phase control mode, when combustion knock occurs in the engine.

In order to accomplish the aforementioned and other objects of the present invention, a combustion control system for a spark-ignition internal combustion engine comprises a variable piston stroke characteristic mechanism that changes a compression ratio of the engine, sensors that detect engine speed and engine load, at least one of a variable lift and working-angle control mechanism that simultaneously continuously changes a valve lift of an intake valve of the engine and a working angle of the intake valve and a variable phase control mechanism that changes an angular phase at a central angle corresponding to a maximum valve lift point of the intake valve, the working angle being defined as an angle between a crank angle at valve open timing of the intake valve and a crank angle at valve closure timing of the intake valve, and a control unit being configured to be electronically connected to the variable piston stroke characteristic mechanism, the sensors, and the at least one of the variable lift and working-angle control mechanism and the variable phase control mechanism, for controlling the variable piston stroke characteristic mechanism, and the at least one of the variable lift and working-angle control mechanism and the variable phase control mechanism, depending on the engine speed and the engine load.

According to another aspect of the invention, an integrated combustion control system for a spark-ignition internal combustion engine comprises variable piston stroke characteristic means for changing a compression ratio of the engine, sensor means for detecting engine speed and engine load, at least one of variable lift and working-angle control means for simultaneously continuously changing a valve lift of an intake valve of the engine and a working angle of the intake valve and variable phase control means for changing an angular phase at a central angle corresponding to a maximum valve lift point of the intake valve, the working angle being defined as an angle between a crank angle at valve open timing of the intake valve and a crank angle at valve closure timing of the intake valve, and control means being configured to be electronically connected to the variable piston stroke characteristic means, the sensor means, and the at least one of the variable lift and working-angle control means and the variable phase control means, for controlling the variable piston stroke characteristic means, and the at least one of the variable lift and working-angle control means and the variable phase control means, depending on the engine speed and the engine load.

According to a still further aspect of the invention, a method for controlling combustion of a spark-ignition internal combustion engine employing a variable piston stroke characteristic mechanism that changes a compression ratio of the engine, a variable lift and working-angle control mechanism that simultaneously continuously changes a valve lift of an intake valve of the engine and a working angle of the intake valve so that the valve lift increases as the working angle increases, and a variable phase control mechanism that changes an angular phase at a central angle corresponding to a maximum valve lift point of the intake valve, the working angle being defined as an angle between a crank angle at valve open timing of the intake valve and a crank angle at valve closure timing of the intake valve, the method comprises detecting an intensity of knocking and generating a signal indicative of the intensity of knocking, detecting engine operating conditions including both engine speed and engine load, retrieving a desired working angle, a desired central angle and a desired compression ratio from a predetermined priority control map showing how the working angle, the central angle, and the compression ratio have to be varied relative to the engine operating conditions, controlling the working angle so that an actual working angle is brought closer to the desired working angle, controlling the central angle so that an actual central angle is brought closer to the desired central angle, controlling the compression ratio so that an actual compression ratio is brought closer to the desired compression ratio, controlling an ignition timing from a time when the signal from the knock sensor exceeds a predetermined slice level by way of trace-knock control that a change in the ignition timing is substantially inversely proportional to a change in the compression ratio during a full throttle condition, during an accelerating condition with a small valve overlap period, or during a part load condition with a small intake-pipe vacuum, controlling the ignition timing from the time when the signal from the knock sensor exceeds the predetermined slice level by way of trace-knock control that a change in the ignition timing is substantially inversely proportional to a change in the central angle during an accelerating condition with a large valve overlap period, and controlling the ignition timing from the time when the signal from the knock sensor exceeds the predetermined slice level by way of trace-knock control that a change in the ignition timing is substantially inversely proportional to a change in the valve closure timing during a part load condition with a large intake-pipe vacuum.

The other objects and features of this invention will become understood from the following description with reference to the accompanying drawings.

BRIEF DESCRIPTION OF THE DRAWINGS

FIGS. 10A–10E respectively show a variation in a knock sensor signal value, a variation in compression ratio ε, a characteristic for trace-knock control for ignition timing IA, a variation in intake-pipe vacuum V, and a variation in intake-valve central angle φ, in presence of knocking when a valve overlap O/L exceeds its predetermined threshold value during an accelerating condition.

FIGS. 12A–12E respectively show a variation in a knock sensor signal value, a variation in compression ratio ε, a characteristic for trace-knock control for ignition timing IA, a variation in intake-pipe vacuum V, and a characteristic for IVC control, in presence of knocking when the intake-pipe vacuum is below its predetermined value during a part-load condition.

FIGS. 13A–13E respectively show a variation in a knock sensor signal value, a variation in compression ratio ε, a characteristic for trace-knock control for ignition timing IA, a variation in intake-pipe vacuum V, and a characteristic for IVC control, in presence of knocking when the intake-pipe vacuum exceeds the predetermined value during the part-load condition.

DESCRIPTION OF THE PREFERRED EMBODIMENTS

Figure 1:
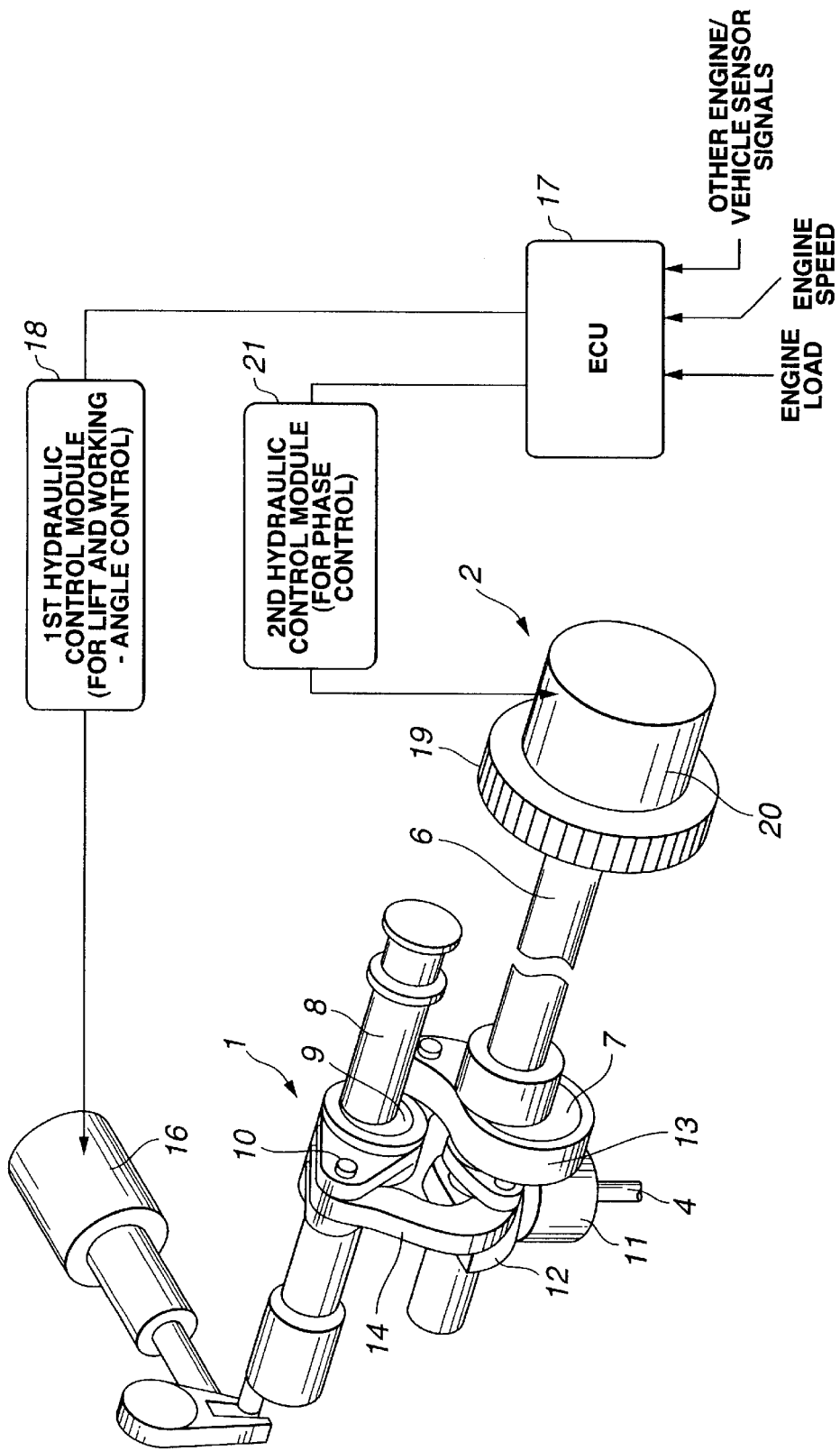
FIG. 1 is a partial system diagram illustrating a variable valve operating mechanism incorporated in an integrated combustion control system of the embodiment.
Figure 6:
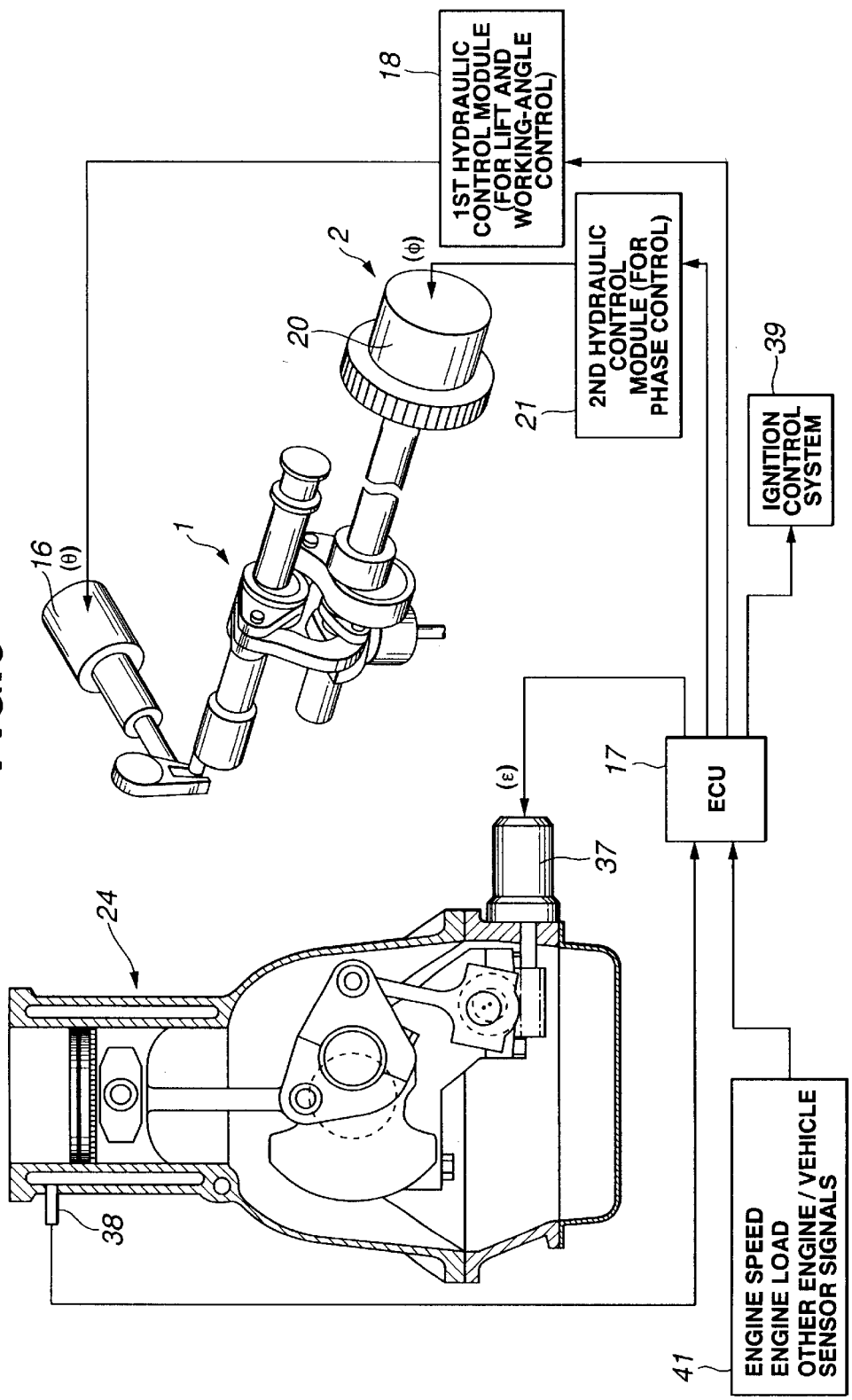
FIG. 6 is a total system block diagram showing the integrated combustion control system of the embodiment.

Referring now to the drawings, particularly to FIGS. 1 and 6, the integrated combustion control system of the embodiment has three different control mechanisms, namely a variable lift and working-angle control mechanism 1, a variable phase control mechanism 2, and a variable piston stroke characteristic mechanism 24. As best seen in FIG. 1, variable lift and working-angle control mechanism 1 functions to change (increase or decrease) both a valve lift and a working angle θ of an intake valve 4, depending on engine/vehicle operating conditions. Variable phase control mechanism 2 functions to change (advance or retard) the angular phase at the maximum valve lift point (at the central angle φ).

Figure 2:
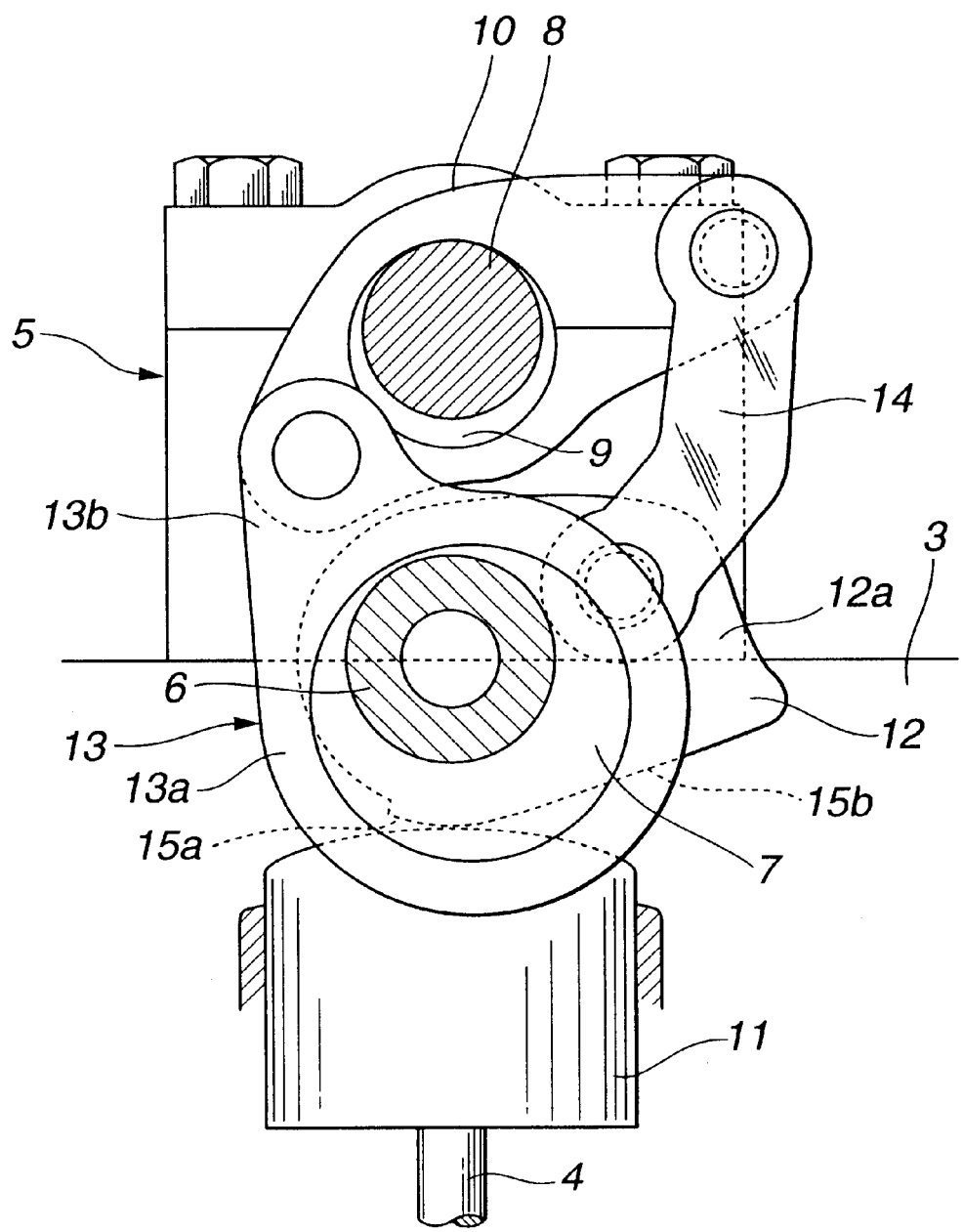
FIG. 2 is a cross-sectional view illustrating an essential part of a variable intake-valve lift and working-angle control mechanism of the integrated combustion control system shown in FIG. 1.

Referring now to FIG. 2, there is shown the fundamental structure of the essential part of variable intake-valve lift and working-angle control mechanism 1. The fundamental structure of variable lift and working-angle control mechanism 1 is hereunder described briefly in reference to FIGS. 1 and 2.

Variable lift and working-angle control mechanism 1 is comprised of a cylindrical-hollow drive shaft 6 rotatably supported by a cam bracket 5 located on the upper portion of a cylinder head 3, a first eccentric cam 7 fixedly connected to drive shaft 6 by way of press-fitting, a control shaft 8 which is rotatably supported by cam bracket 5 above the drive shaft and arranged parallel to the drive shaft and has a second eccentric cam 9, a rocker arm 10 oscillatingly or rockably supported on second eccentric cam 9, and a rockable cam 12 which is in abutted-engagement with a valve lifter 11 of intake valve 4. First eccentric cam 7 and rocker arm 10 are mechanically linked to each other through a link arm 13 that rotates relative to first eccentric cam 7. On the other hand, rocker arm 10 and rockable cam 12 are linked to each other through a link member 14, so that the oscillating motion of rocker arm 10 is produced by link arm 13. As described later, drive shaft 6 is driven by an engine crankshaft 29 via a timing chain or a timing belt. First eccentric cam 7 is cylindrical in shape. The central axis of the cylindrical outer peripheral surface of first eccentric cam 7 is eccentric to the axis of drive shaft 6 by a predetermined eccentricity. A substantially annular portion 13a of link arm 13 is rotatably fitted onto the cylindrical outer peripheral surface of first eccentric cam 7. Rocker arm 10 is oscillatingly supported at its substantially central portion by second eccentric cam 9 of control shaft 8. A protruded portion 13b of link arm 13 is linked to one end (the left-hand end in FIG. 2) of rocker arm 10. The upper end of link member 14 is linked to the other end (the right-hand end in FIG. 2) of rocker arm 10. The axis of second eccentric cam 9 is eccentric to the axis of control shaft 8, and thus the center of oscillating motion of rocker arm 10 can be varied by changing the angular position of control shaft 8. Rockable cam 12 is rotatably fitted onto the outer periphery of drive shaft 6. The right-hand end portion 12a of rockable cam 12 is linked to link member 14 by means of a pivot pin. Rockable cam 12 is formed on its lower surface with a base-circle surface portion 15a being concentric to drive shaft 6 and a moderately-curved cam surface portion 15b being continuous with base-circle surface portion 15a and extending toward the right-hand end portion 12a of rockable cam 12. Base-circle surface portion 15a and cam surface portion 15b of rockable cam 12 are designed to be brought into abutted-contact (sliding-contact) with a designated point or a designated position of the upper surface of the associated intake-valve lifter 11, depending on an angular position of rockable cam 12 oscillating. That is, the base-circle surface portion 15a functions as a base-circle section within which a valve lift is zero. A predetermined angular range of cam surface portion 15b being continuous with base-circle surface portion 15a functions as a ramp section. A predetermined angular range of a cam nose portion of cam surface portion 15b being continuous with the ramp section functions as a lift section. Returning again to FIG. 1, control shaft 8 of variable lift and working-angle control mechanism 1 is driven within a predetermined angular range by means of a lift and working-angle control hydraulic actuator 16. A controlled pressure applied to hydraulic actuator 16 is regulated or modulated by way of a first hydraulic control module (a lift and working-angle control hydraulic modulator) 18 which is responsive to a control signal from an electronic engine control unit (ECU) 17. Hydraulic actuator 16 is designed so that the angular position of the output shaft of hydraulic actuator 16 is forced toward and held at an initial angular position by a return spring means with first hydraulic control module 18 de-energized. In a state that hydraulic actuator 16 is kept at the initial angular position, the intake valve is operated with the valve lift reduced and the working angle reduced. Variable lift and working-angle control mechanism 1 operates as follows.

During rotation of drive shaft 6, link arm 13 moves up and down by virtue of cam action of first eccentric cam 7. The up-and-down motion of link arm 13 causes oscillating motion of rocker arm 10. The oscillating motion of rocker arm 10 is transmitted via link member 14 to rockable cam 12, and thus rockable cam 12 oscillates. By virtue of cam action of rockable cam 12 oscillating, intake-valve lifter 11 is pushed and therefore intake valve 4 lifts. If the angular position of control shaft 8 is varied by hydraulic actuator 16, an initial position of rocker arm 10 varies and as a result an initial position (or a starting point) of the oscillating motion of rockable cam 12. Assuming that the angular position of second eccentric cam 9 is shifted from a first angular position (shown in FIG. 2) that the axis of second eccentric cam 9 is located just under the axis of control shaft 8 to a second angular position that the axis of second eccentric cam 9 is located just above the axis of control shaft 8, as a whole rocker arm 10 shifts upwards. As a result, the right-hand end portion 12a of rockable cam 12 is relatively pulled upwards. That is, the initial position (the starting point) of rockable cam 12 is displaced or shifted so that the rockable cam itself is inclined in a direction that cam surface portion 15b of rockable cam 12 moves apart from intake-valve lifter 11. With rocker arm 10 shifted upwards, when rockable cam 12 oscillates during rotation of drive shaft 6, base-circle surface portion 15a is held in contact with intake-valve lifter 11 for a comparatively long time period. In other words, a time period within which cam surface portion 15b is held in contact with intake-valve lifter 11 becomes short. As a consequence, a valve lift becomes small. Additionally, a lifted period (i.e., a working angle θ) from intake-valve open timing (IVO) to intake-valve closure timing (IVC) becomes reduced.

Figure 3:
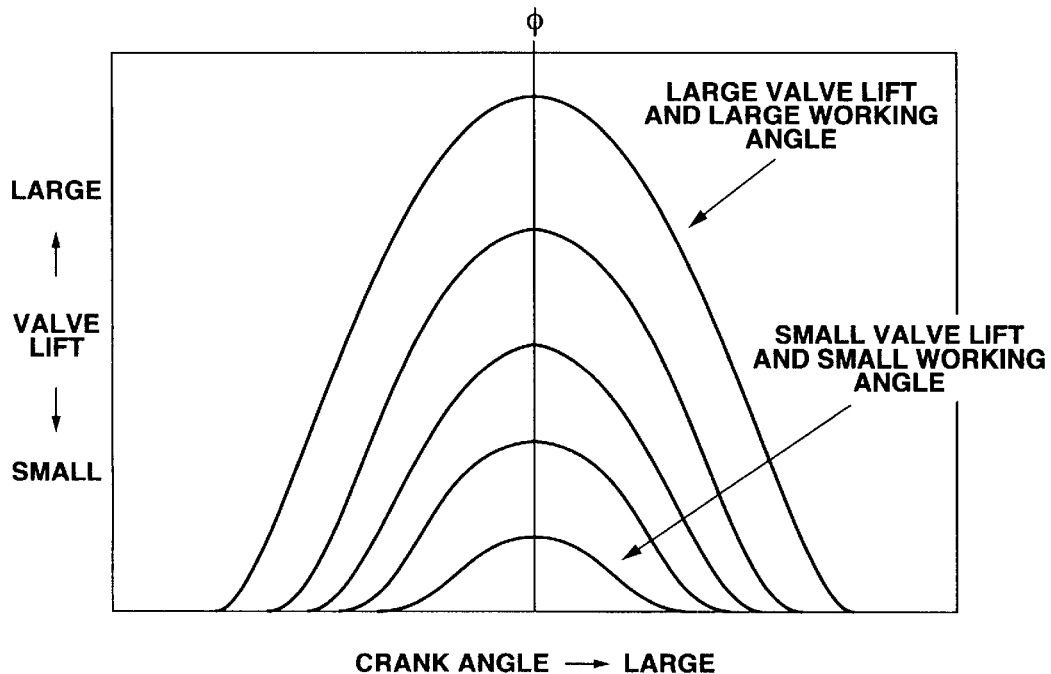
FIG. 3 shows lift and working-angle characteristic curves given by the variable lift and working-angle control mechanism of the integrated combustion control system of the embodiment.

Conversely when the angular position of second eccentric cam 9 is shifted from the second angular position that the axis of second eccentric cam 9 is located just above the axis of control shaft 8 to the first angular position that the axis of second eccentric cam 9 is located just under the axis of control shaft 8, as a whole rocker arm 10 shifts downwards. As a result, the right-hand end portion 12a of rockable cam 12 is relatively pushed down. That is, the initial position (the starting point) of rockable cam 12 is displaced or shifted so that the rockable cam itself is inclined in a direction that cam surface portion 15b of rockable cam 12 moves towards intake-valve lifter 11. With rocker arm 10 shifted downwards, when rockable cam 12 oscillates during rotation of drive shaft 6, a portion that is brought into contact with intake-valve lifter 11 is somewhat shifted from base-circle surface portion 15a to cam surface portion 15b. As a consequence, a valve lift becomes large. Additionally, a lifted period (i.e., a working angle θ) from intake-valve open timing (IVO) to intake-valve closure timing (IVC) becomes extended. The angular position of second eccentric cam 9 can be continuously varied within limits by means of hydraulic actuator 16, and thus valve lift characteristics (valve lift and working angle) also vary continuously as shown in FIG. 3. As can be seen from the valve lift characteristics of FIG. 3, variable lift and working-angle control mechanism 1 can scale up and down both the valve lift and the working angle continuously simultaneously. As clearly seen in FIG. 3, the variable lift and working-angle control mechanism 1 incorporated in the integrated combustion control system of the embodiment, in accordance with a change in valve lift and a change in working angle θ, intake-valve open timing IVO and intake-valve closure timing IVC vary symmetrically with each other. Details of such a variable lift and working-angle control mechanism being set forth, for example, in U.S. Pat. No. 5,988,125 (corresponding to Japanese Patent Provisional Publication No. 11-107725) issued Nov. 23, 1999 to Seinosuke HARA et al., the teachings of which are hereby incorporated by reference.

Figure 4:
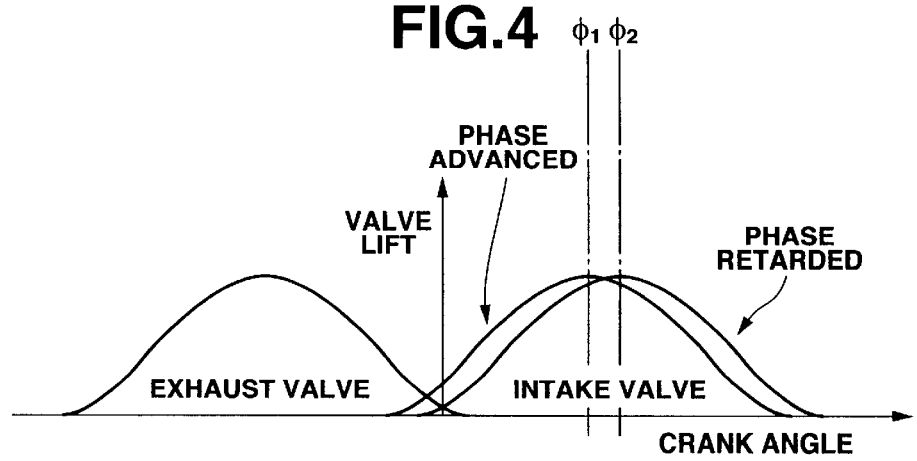
FIG. 4 shows phase-change characteristic curves for a phase of working angle that means an angular phase at the maximum valve lift point, often called "central angle $\phi$", given by the variable phase control mechanism of the integrated combustion control system of the embodiment.

Returning to FIG. 1, variable phase control mechanism 2 is comprised of a sprocket 19 and a phase control hydraulic actuator 20. Sprocket 19 is provided at the front end of drive shaft 6. Phase control hydraulic actuator 20 is provided to enable drive shaft 6 to rotate relative to sprocket 19 within a predetermined angular range. Sprocket 19 has a driven connection with the engine crankshaft through a timing chain (not shown) or a timing belt (not shown). A controlled pressure applied to hydraulic actuator 20 is regulated or modulated by way of a second hydraulic control module 21 (a phase control hydraulic modulator), which is responsive to a control signal from ECU 17. The relative rotation of drive shaft 6 to sprocket 19 in one rotational direction results in a phase advance at the maximum intake-valve lift point (at the central angle $\phi$). The relative rotation of drive shaft 6 to sprocket 19 in the opposite rotational direction results in a phase retard at the maximum intake-valve lift point. As appreciated from the phase-change characteristic curves shown in FIG. 4, only the phase of working angle (i.e., the angular phase at central angle $\phi$) is advanced (see the characteristic curve of a central angle $\phi_1$ of FIG. 4) or retarded (see the characteristic curve of a central angle $\phi_2$ of FIG. 4), with no valve-lift change and no working-angle change. The relative angular position of drive shaft 6 to sprocket 19 can be continuously varied within limits by means of hydraulic actuator 20, and thus the angular phase at central angle $\phi$ also vary continuously. In the shown embodiments, each of actuators 16 and 20 are hydraulically controlled. Alternatively, each of a lift and working-angle control actuator or a phase control actuator may be constructed by an electromagnetically controlled actuator. In lieu thereof, for variable lift and working-angle control and variable phase control, a first sensor that detects a valve lift and working angle θ and a second sensor that detects an angular phase at central angle $\phi$ are added and variable lift and working-angle control mechanism 1 and variable phase control mechanism 2 may be feedback-controlled respectively based on signals from the first and second sensors at a "closed-loop" mode. Alternatively, variable lift and working-angle control mechanism 1 and variable phase control mechanism 2 may be merely feedforward-controlled depending on engine/vehicle operating conditions at an "open-loop" mode.

Figure 5:
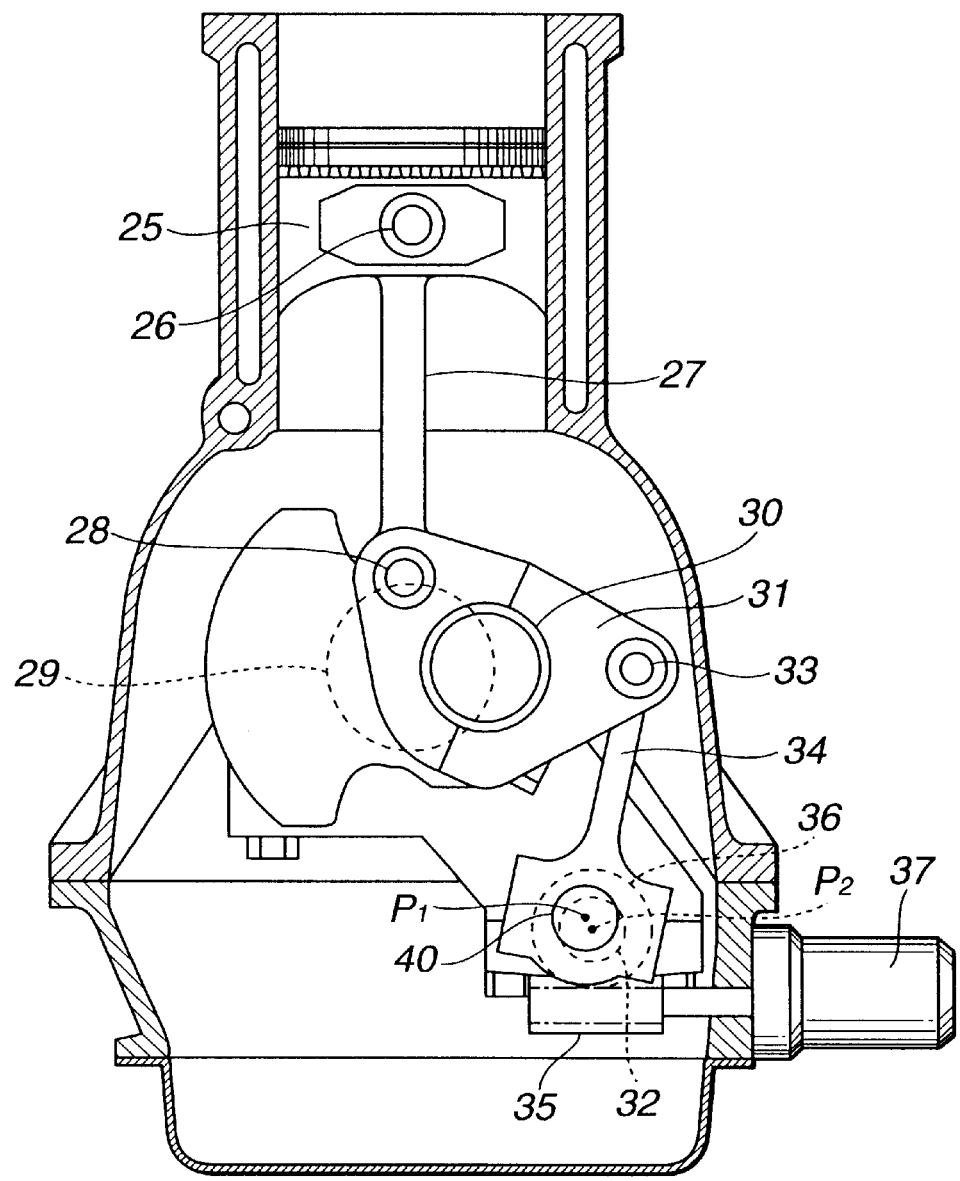
FIG. 5 is a cross-sectional view illustrating a variable piston stroke characteristic mechanism incorporated in the integrated combustion control system of the embodiment.

Referring now to FIG. 5, there is shown variable piston stroke characteristic mechanism 24 incorporated in the integrated combustion control system of the embodiment. The variable piston stroke characteristic mechanism is comprised of a multiple-link type piston crank mechanism or a multiple-link type variable compression ratio mechanism. A linkage of variable piston stroke characteristic mechanism 24 (multiple-link type piston crank mechanism) is composed of three links, namely an upper link 27, a lower link 31 and a control link 34. One end of upper link 27 is connected via a piston pin 26 to a reciprocating piston 25. Lower link 31 is oscillatingly connected or linked to the other end of the upper link via an upper link pin 28. Lower link 31 is also linked to a crankpin 30 of engine crankshaft 29. Also provided is a control shaft 32 extending substantially parallel to crankshaft 29. Control link 34 is oscillatingly connected at one end to control shaft 32. Control link 34 is oscillatingly connected at the other end to lower link 31 via a control link pin 33, so as to restrict the degree of freedom of the lower link. Control shaft 32 is formed with a plurality of pin journals 40 each of which is formed for every engine cylinder and rotatably supported by a bearing (not shown) provided at the lower end of control link 34. A rotation center P1 of each of pin journals 40 is eccentric to a rotation center P2 of control shaft 32 by a predetermined eccentricity. The rotation center P1 of pin journals serves as a center of oscillating motion of control link 34 that oscillates about the rotation center P2 of control shaft 32. As can be appreciated from the cross section of FIG. 5, the center P1 of oscillating motion of control link 34 varies due to rotary motion of control shaft 32. As a result, at least one of the TDC position and the BDC position can be varied and thus the piston stroke characteristic can be varied. That is, it is possible to increase or decrease the compression ratio $\epsilon$, defined as a ratio $(V_1+V_2)/V_1$ of the full volume $(V_1+V_2)$ existing within the engine cylinder and combustion chamber with the piston at BDC to the clearance-space volume $(V_1)$ with the piston at TDC, by varying the center P1 of oscillating motion of control link 34. In other words, by changing or shifting the center of oscillating motion of control link 34, the attitude of lower link 31 changes, thus varying at least one of the TDC position and BDC position of reciprocating piston 25 and consequently varying the compression ratio $\epsilon$ of the engine. The previously-noted control shaft 32 is driven by means of an electronically controlled piston-stroke characteristic control actuator 37. As seen in FIG. 6, a worm gear 35 is attached to the output shaft of actuator 37 (a power source), while a worm wheel 36 is fixedly connected to the control shaft 32 so that the worm wheel is coaxially arranged with respect to the axis of control shaft 32. Actuator 37 is controlled in response to a control signal from ECU 17 depending on engine operating conditions, and thus the center of oscillating motion of control link 34 can be varied. In lieu thereof, for variable piston stroke characteristic control, a piston-stroke sensor that detects a piston stroke of reciprocating piston 25 is added and variable piston stroke characteristic mechanism 24 may be feedback-controlled based on a signal from the piston-stroke sensor at a "closed-loop" mode. Alternatively, variable piston stroke characteristic mechanism 24 may be merely feedforward-controlled depending on engine/vehicle operating conditions at an "open-loop" mode.

Referring now to FIG. 6, there is shown the system block diagram of the integrated combustion control system of the embodiment. As appreciated from the system block diagram of FIG. 6, in the integrated combustion control system of the embodiment, the intake-valve side variable valve operating mechanism that is, variable lift and working-angle control mechanism 1 plus variable phase control mechanism 2 (see FIG. 1) is combined with variable piston stroke characteristic mechanism 24 (see FIG. 5). In FIG. 6, a component part denoted by reference sign 38 is a detonation sensor or a knock sensor 38 that is mounted on the engine to detect cylinder ignition knock (the intensity of detonation or combustion chamber knock), with its location being often screwed into the coolant jacket or into the engine cylinder block. In the shown embodiment, knock sensor 38 is screwed into the cylinder block. A sensor signal from knock sensor 38 is sent to an input interface circuitry of ECU 17. In the system of the embodiment, engine speed is detected by means of a crank angle sensor or a crank position sensor, whereas engine load is detected by means of a throttle-opening sensor that detects a throttle opening of a throttle valve. Electronic engine control unit ECU 17 generally comprises a microcomputer. ECU 17 includes an input/output interface (I/O), memories (RAM, ROM), and a microprocessor or a central processing unit (CPU). The input/output interface (I/O) of ECU 17 receives input information from various engine/vehicle sensors 41, namely the crank angle sensor (engine speed sensor), the throttle-opening sensor (engine load sensor), knock sensor 38, an exhaust-temperature sensor, an engine vacuum sensor, an engine temperature sensor, an engine oil temperature sensor, an accelerator-opening sensor and the like. Although the system of the embodiment uses the throttle opening as engine-load indicative data, in lieu thereof negative pressure in an intake pipe or intake manifold vacuum or a quantity of intake air or a fuel-injection amount may be used as engine load parameters. Within ECU 17, the central processing unit (CPU) allows the access by the I/O interface of input informational data signals from the previously-discussed engine/vehicle sensors. The CPU of ECU 17 is responsible for carrying the integrated engine combustion control program related to knocking avoidance control, variable piston stroke characteristic control (variable compression-ratio $\epsilon$ control), variable intake-valve working angle $\theta$ control, and variable intake-valve central angle $\phi$ control (variable intake-valve phase control) stored in memories and is capable of performing necessary arithmetic and logic operations shown in FIG. 14. Computational results (arithmetic calculation results), that is, calculated output signals (drive currents) are relayed via the output interface circuitry of the ECU to output stages, namely an electronic ignition-timing control system (an ignition timing advancer) 39, electromagnetic solenoids constructing component parts of first and second hydraulic control modules 18 and 21, and electronically-controlled piston-stroke characteristic control actuator 37.

Figure 7:
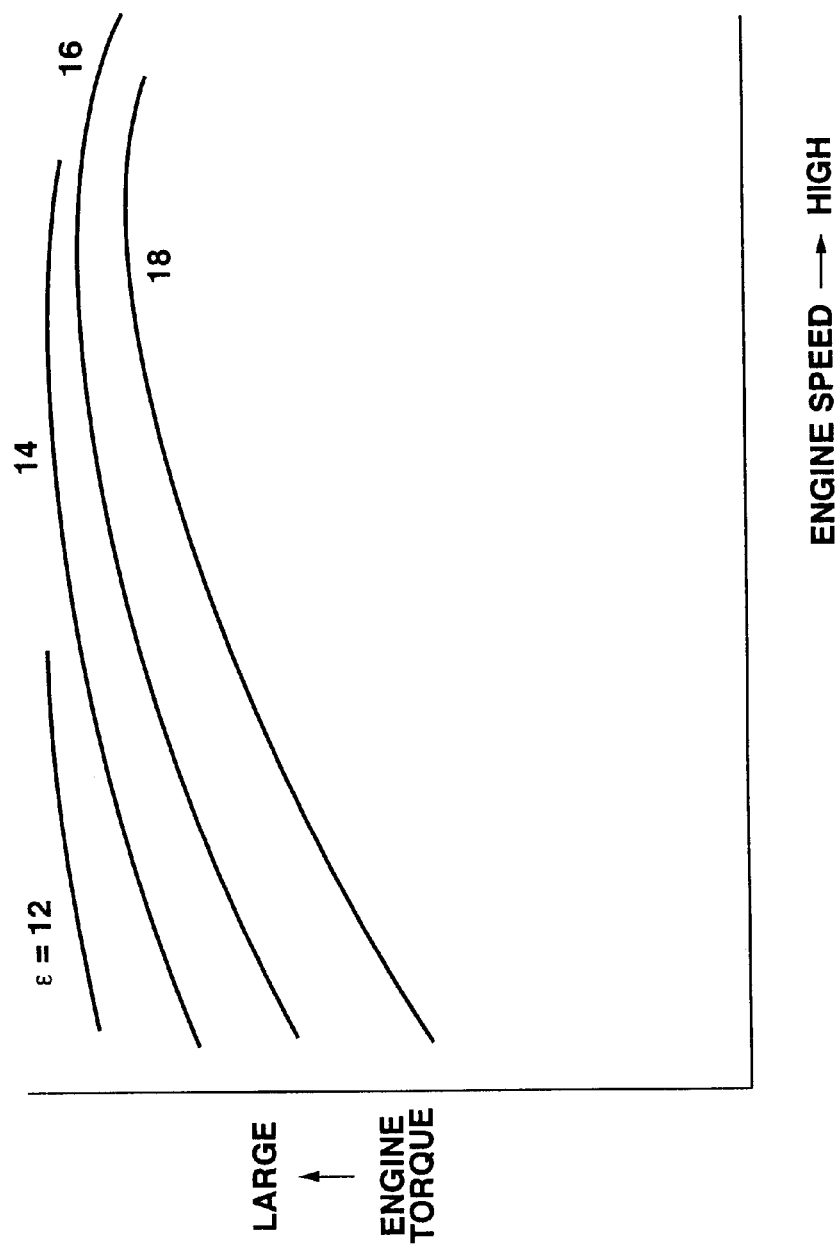
FIG. 7 shows characteristic curves for compression ratio ε variably controlled by the variable piston stroke characteristic mechanism depending on engine operating conditions.

Referring now to FIG. 7, there is shown the characteristic curves for compression ratio $\epsilon$ variably controlled by means of variable piston stroke characteristic mechanism 24 depending on engine operating conditions (such as engine load and engine speed) of the spark-ignition internal combustion engine employing variable lift and working-angle control mechanism 1, variable phase control mechanism 2, and variable piston stroke characteristic mechanism 24 combined with each other. As can be seen from the characteristic curves of FIG. 7, the control characteristic of compression ratio $\epsilon$ can be determined by only a change in the full volume $(V_1+V_2)$ existing within the engine cylinder and combustion chamber with the piston at BDC, whose volume change occurs due to a change in piston stroke characteristic controlled or determined by variable piston stroke characteristic mechanism 24. On the other hand, the effective compression ratio $\epsilon'$, defined as a ratio of the effective cylinder volume corresponding to the maximum working medium volume to the effective clearance volume corresponding to the minimum working medium volume, is determined by the intake valve closure timing (IVC) which is dependent on the engine operating conditions, that is, at idle, at part load whose condition is often abbreviated to "R/L (Road/load)" substantially corresponding to a ¼ throttle opening, during acceleration, at full throttle and low speed, and at full throttle and high speed (see FIG. 8).

Figure 8:
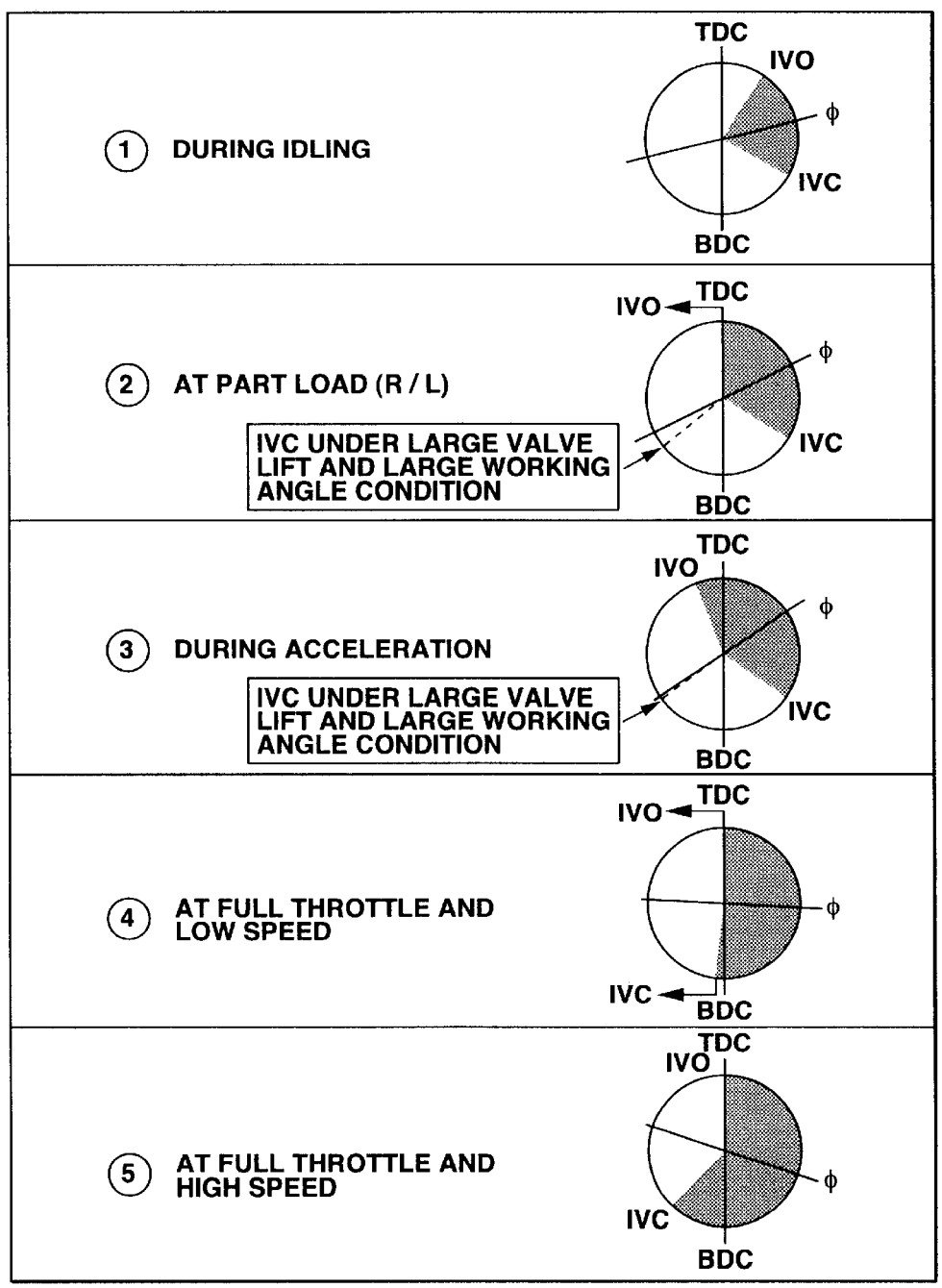
FIG. 8 is an explanatory view showing the operation of the intake valve, in other words, an intake valve open timing (IVO) and an intake valve closure timing (IVC), under various engine/vehicle operating conditions, that is, during idling, at part load, during acceleration, at full throttle and low speed, and at full throttle and high speed.

As shown in FIG. 8, at the idling condition ① and at the part load condition ②, each of the valve lift and working angle θ of the intake valve is controlled to a comparatively small value. On the other hand, the intake valve closure timing (IVC) is phase-advanced to a considerably earlier point before bottom dead center (BBDC). Due to the IVC considerably advanced, it is possible to greatly reduce the pumping loss. At this time, assuming that compression ratio ε is kept fixed, the effective compression ratio ε' tends to reduce. The reduced effective compression ratio deteriorates the quality of combustion of the air-fuel mixture in the engine cylinder. Therefore, in such a low engine-load range (in a small engine torque range) such as under the idling condition ① and under the part load condition ②, as can be appreciated from the engine operating conditions (engine speed and load) versus compression ratio characteristic curves of FIG. 7, compression ratio ε is set or adjusted to a higher compression ratio.

Under the acceleration condition ③, in order to enhance the charging efficiency of intake air, the valve lift of intake valve 4 is controlled to a comparatively large value, and the valve overlap period is also increased. As compared to the idling condition ① and part load condition ②, the IVC at acceleration condition ③ is closer to BDC, but somewhat phase-advanced to an earlier point before BDC. Under the acceleration condition ③, as a matter of course the throttle opening is increased in comparison with the two engine operating conditions ① and ②. On the other hand, compression ratio ε is set or adjusted to a lower compression ratio than the light load condition ②. The decreasingly-compensated compression ratio is necessary to prevent combustion knock from occurring in the engine.

Under the full throttle and low speed condition ④ or under the full throttle and high speed condition ⑤, in order to produce the maximum intake-air quantity, effective compression ratio ε' is controlled to a higher effective compression ratio than the above three engine operating conditions ①, ② and ③. For this reason, under the full throttle and low speed condition, compression ratio ε determined by the controlled piston stroke characteristic is set to a low compression ratio substantially identical to that of a conventional fixed compression-ratio internal combustion engine. In contrast to the above, under the full throttle and high speed condition, combustion is completed before a chemical reaction for peroxide (one of factors affecting combustion knock) develops, and thus compression ratio ε determined by the controlled piston stroke characteristic is set to a higher compression ratio than that under the full throttle low speed condition. Due to setting to a higher compression ratio, an expansion ratio becomes high and thus the exhaust temperature also becomes lowered suitably, thereby preventing catalysts used in a catalytic converter from being degraded undesirably. Actually, to optimize the above-mentioned parameters (the intake-valve lift, intake-valve working angle θ, intake-valve central angle φ, compression ratio ε determined by the controlled piston stroke characteristic) for various engine/vehicle operating conditions such as engine speed and engine load, these parameters (the lift, θ, φ, ε) are determined depending on predetermined or preprogrammed characteristic maps. On the other hand, the ignition timing is controlled by means of electronic ignition-timing control system 39 that uses a signal from the throttle-opening sensor or the accelerator-opening sensor to optimize the ignition timing for engine operating conditions. In particular, when a knocking condition is detected, the ignition timing is retarded by means of ignition-timing control system 39.

Figure 9A:
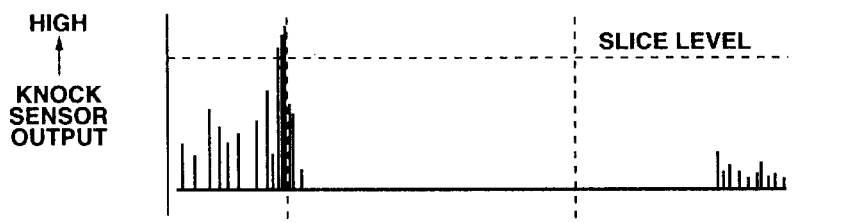
FIGS. 9A–9D respectively show a variation in a knock sensor signal value, a variation in compression ratio ε, a characteristic for trace-knock control for an ignition timing IA, and a characteristic for IVC control, in presence of knocking during full throttle.
Figure 9B:
Figure 9C:
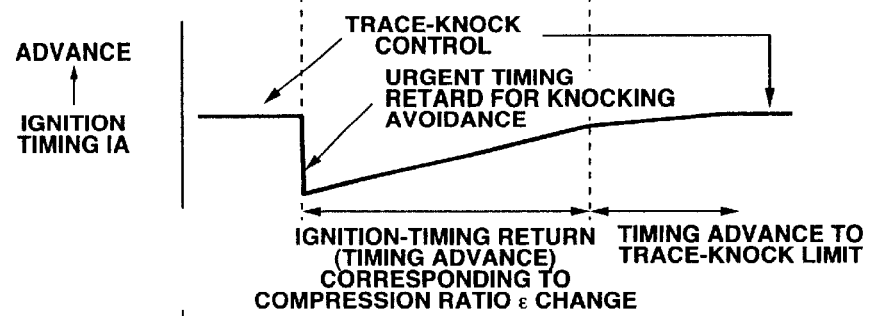
Figure 9D:
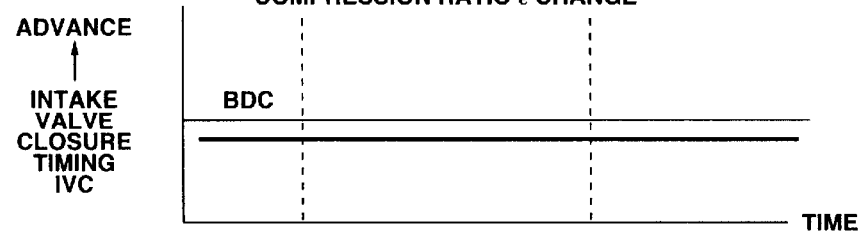

Referring now to FIGS. 9A–9D, there is shown the knocking avoidance control (simply, knock control) executed by the system of the embodiment on the full throttle conditions ④ and ⑤. As shown in FIG. 9A, the ECU determines that combustion knock occurs in the engine when a signal from knock sensor 38 exceeds a predetermined slice level of resonance. During the full throttle conditions ④ and ⑤, the IVC is set or controlled to a preprogrammed timing value at which the maximum charging efficiency is obtained and that corresponds to a timing value closer to BDC at the full throttle low speed condition ④. In such a condition, there is a less sensitivity of a change in effective compression ratio ε' relative to a change in intake-valve closure timing IVC (that is, an increase or decrease in intake-valve lift, an extension or reduction in working angle of intake valve 4, and an advance or retard of the angular phase at central angle φ). Under these conditions, assuming that the IVC is greatly changed (advanced), the intake-air quantity is also reduced undesirably. The change in IVC is not suitable for the full throttle condition. For the reasons set forth above, as shown in FIG. 9B, according to the system of the embodiment, as a basic operating mode, compression ratio ε is gradually reduced to a proper low compression ratio by changing the piston stroke characteristic from the time when the predetermined slice level is attained and the ECU determines that the combustion chamber knocking occurs. As a result, the engine output torque or engine power can be controlled to a higher level than that obtained by the ignition-timing retard control. However, there is a slight time delay from the time when piston-stroke characteristic control actuator 37 begins to operate to the time when an actual change (an actual drop) in compression ratio ε occurs. For this reason, in order to instantaneously avoid combustion knock, the ignition timing IA is retarded by way of a so-called trace-knock control. Note that the characteristic for ignition-timing trace-knock control of FIG. 9C is substantially inversely proportional to that for variable piston-stroke characteristic control of FIG. 9B. On the other hand, intake valve closure timing IVC is fixed to a given timing value after BDC (see FIG. 9D).

Referring now to FIGS. 10A–10E, there is shown the knock control executed by the system of the embodiment on the acceleration condition ③ with a large overlapping of exhaust and inlet periods (with a large valve overlap). When reducing the pumping loss by virtue of a large valve overlap during the accelerating condition while utilizing internal EGR (exhaust gas or combustion gas recirculated from the exhaust port through the engine cylinder back to the intake port side), in order to avoid knocking, it is effective to reduce high-temperature residual gas. In such a case, the system of the embodiment operates to rapidly reduce the residual gas by phase-retarding the intake-valve central angle φ by means of variable phase control mechanism 2 from the time when the predetermined slice level is attained and thus the ECU determines that combustion knock occurs in the engine (see FIGS. 10A and 10E). As shown in FIG. 10B, compression ratio ε is fixed to a given compression ratio. There is a slight time delay from the time when variable phase control mechanism 2 begins to operate to the time when an actual phase change in intake-valve central angle φ occurs. In order to instantaneously avoid combustion knock, the ignition timing IA is retarded by way of trace-knock control (see FIG. 10C). Note that the characteristic for ignition-timing trace-knock control of FIG. 10C is substantially inversely proportional to that for variable phase control of FIG. 10E. On the other hand, as shown in FIG. 10D, a drop in intake-pipe vacuum V occurs at the time when combustion knocking is detected and thereafter intake-pipe vacuum V moderately rises.

Figure 11A:
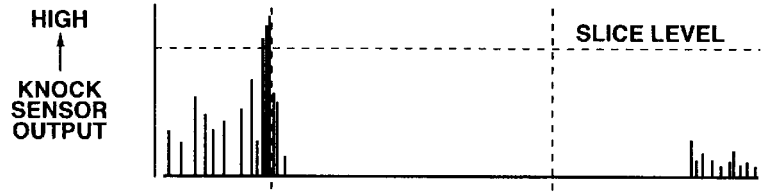
FIGS. 11A–11E respectively show a variation in a knock sensor signal value, a variation in compression ratio ε, a characteristic for trace-knock control for ignition timing IA, a variation in intake-pipe vacuum V, and a variation in intake-valve central angle φ, in presence of knocking when a valve overlap is below the predetermined threshold value during the accelerating condition.
Figure 11B:
Figure 11C:
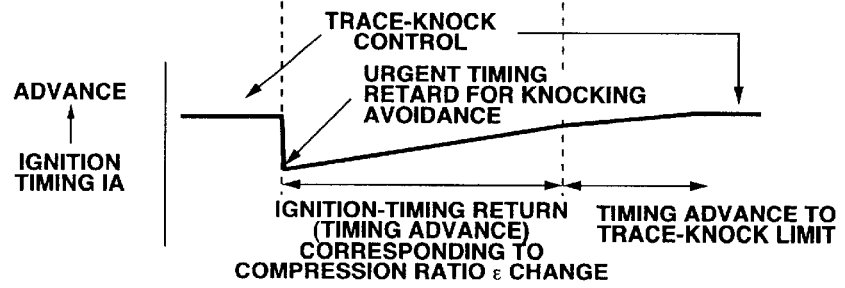
Figure 11D:
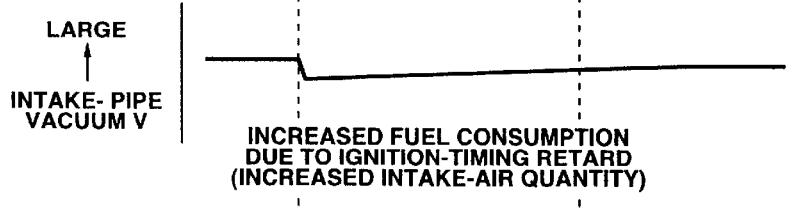
Figure 11E:
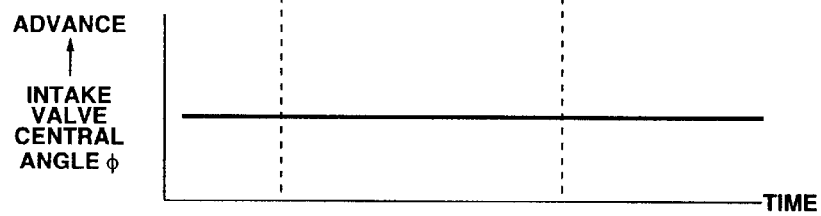

Referring now to FIGS. 11A–11E, there is shown the knock control executed by the system of the embodiment on the acceleration condition ③ with a small valve overlap. In the same manner as the operating mode for full throttle conditions ④ and ⑤, during the accelerating condition ③ with a small valve overlap it is effective to reduce compression ratio $\epsilon$ to a proper low compression ratio by changing the piston stroke characteristic from the time when the predetermined slice level is attained and the ECU determines that the combustion chamber knocking occurs (see FIG. 11B). In this case, to compensate for the delay in an actual drop in compression ratio $\epsilon$, the previously-noted trace-knock control is used in combination (see FIG. 11C). As shown in FIG. 11E, intake-valve central angle $\phi$ is fixed to a given crank angle. On the other hand, as shown in FIG. 11D, a drop in intake-pipe vacuum V occurs at the time when combustion knocking is detected and then intake-pipe vacuum V moderately rises.

Referring now to FIGS. 12A–12E, there is shown the knock control executed by the system of the embodiment on the part load condition ② with a small intake-pipe vacuum. During part load condition, the pumping loss is reduced by changing the piston stroke characteristic. When intake-pipe vacuum V is below the predetermined value on part load condition, there is a decreased tendency for effective compression ratio $\epsilon'$ to drop due to a change in intake valve closure timing IVC. In such a part load condition with a small intake-pipe vacuum, it is effective to reduce compression ratio $\epsilon$ to a proper low compression ratio by changing the piston stroke characteristic from the time when the predetermined slice level is attained and the ECU determines that the combustion chamber knocking occurs (see FIG. 12B). In this case, to compensate for the delay in an actual drop in compression ratio $\epsilon$, the previously-noted trace-knock control is used in combination (see FIG. 12C). As shown in FIG. 12D, the intake-pipe vacuum V below the predetermined value further drops at the time when knocking is detected and thereafter intake-pipe vacuum V moderately rises. On the other hand, intake valve closure timing IVC is fixed to a given timing value before BDC (see FIG. 12E).

Referring now to FIGS. 13A–13E, there is shown the knock control executed by the system of the embodiment on the part load condition with a large intake-pipe vacuum. When intake-pipe vacuum V exceeds the predetermined value on part load condition, there is an increased tendency for effective compression ratio $\epsilon'$ to drop due to a change in intake valve closure timing IVC (that is, an increase or decrease in intake-valve lift, an extension or reduction in working angle of intake valve 4, and an advance or retard of the angular phase at central angle $\phi$). In such a case, as shown in FIG. 13B, compression ratio $\epsilon$ is fixed to a given compression ratio. That is, instead of varying compression ratio $\epsilon$ by way of variable piston stroke characteristic control, it is effective to reduce effective compression ratio $\epsilon'$ by changing (advancing) intake valve closure timing IVC before BDC by means of variable lift and working angle control mechanism 1 or variable phase control mechanism 2. Therefore, as shown in FIG. 13D, due to the IVC phase change (IVC timing advance), intake-valve vacuum V tends to gradually decrease from the time when knocking is detected. This results in a drop in the charging efficiency of air-fuel mixture, that is, a reduction in the pumping loss. To compensate for the delay in an actual phase advance of intake valve closure timing IVC, the previously-noted trace-knock control is used in combination (see FIG. 13C). Note that the characteristic for ignition-timing trace-knock control of FIG. 13C is substantially proportional to that for variable IVC control of FIG. 13E.

Figure 14:
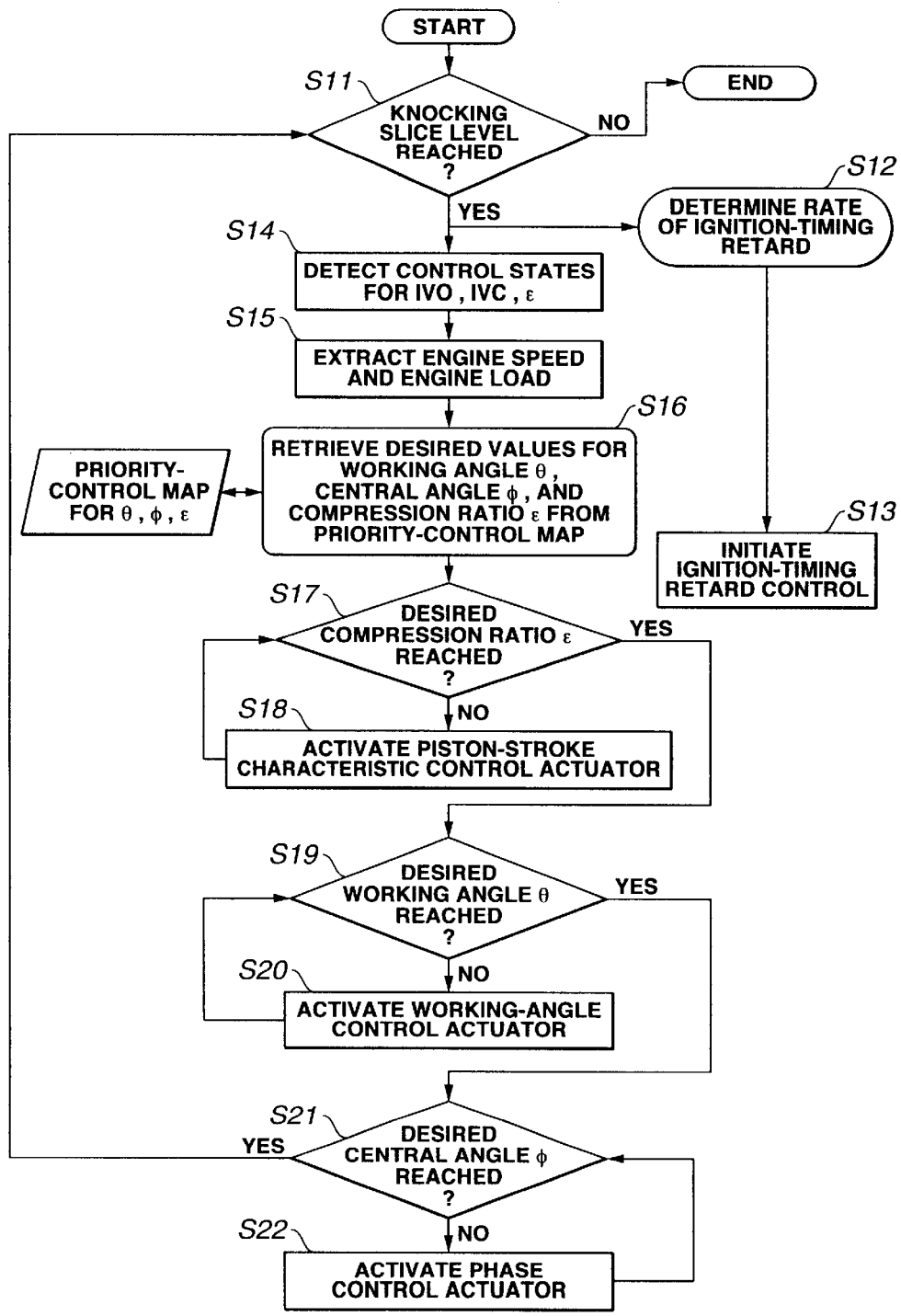
FIG. 14 is a flow chart illustrating an integrated combustion control routine by which ignition-timing retard control, variable compression-ratio ε control (variable piston stroke characteristic control), variable lift and intake-valve working angle θ control, and variable intake-valve central angle φ control (variable intake-valve phase control) are selectively executed.

Referring now to FIG. 14, there is shown the integrated combustion control routine through which ignition-timing retard control for knocking avoidance is engaged (enabled) or disengaged (disabled), and additionally variable compression-ratio $\epsilon$ control (variable piston stroke characteristic control), variable lift and intake-valve working angle $\theta$ control and variable intake-valve central angle $\phi$ control (variable intake-valve phase control) are selectively executed in accordance with a predetermined or preprogrammed priority control map. The arithmetic processing or the routine shown in FIG. 14 is executed as time-triggered interrupt routines to be triggered every predetermined time intervals such as 10 msec.

At step S11, a check is made to determine whether the predetermined slice level for the output signal from knock sensor 38 is reached. When the answer to step S11 is in the affirmative (YES), the routine proceeds from step S11 to steps S12 or S14. When the answer to step S11 is in the negative (NO), one cycle of this routine terminates.

At step S12, a rate of ignition-timing retard is determined based on the engine/vehicle sensor input data, such as engine speed, engine load, engine temperature and the like, and the engine/vehicle operating mode.

At step S13, initiate the ignition-timing retard control based on the rate of ignition-timing retard determined through step S12.

At step S14, current control states for intake valve open timing IVO, intake valve closure timing IVC, and compression ratio $\epsilon$ determined by the piston stroke characteristic controlled by variable piston stroke characteristic mechanism 24 are detected or extracted.

Subsequently to step S14, step S15 occurs. At step S15, the engine speed and engine load are both extracted.

Thereafter, at step S16, a desired value of working angle $\theta$, a desired value of intake-valve central angle $\phi$ and a desired value of compression ratio $\epsilon$ are retrieved from a predetermined or preprogrammed priority control map showing how intake-valve working angle $\theta$, intake-valve central angle $\phi$ and compression ratio $\epsilon$ have to be varied relative to engine/vehicle operating conditions.

After step S16, step S17 occurs. At step S17, a check is made to determine whether the desired value of compression ratio $\epsilon$ is attained. When the answer to step S17 is affirmative (YES), the routine proceeds from step S17 to step S19. Conversely when the answer to step S17 is negative (NO), the routine proceeds from step S17 to step S18.

At step S18, piston-stroke characteristic control actuator 37 is energized or activated so that compression ratio $\epsilon$ is brought closer to its desired value map-retrieved through step S16. That is, steps S17 and S18 are repeatedly executed until the desired compression ratio is reached.

At step S19, a check is made to determine whether the desired value of intake-valve working angle $\theta$ is attained or reached. When the answer to step S19 is affirmative (YES), the routine proceeds from step S19 to step S21. Conversely when the answer to step S19 is negative (NO), the routine proceeds from step S19 to step S20.

At step S20, working-angle control actuator 16 is activated so that intake-valve working angle θ is brought closer to its desired value map-retrieved through step S16. That is, steps S19 and S20 are repeatedly executed until the desired intake-valve working angle is reached.

At step S21, a check is made to determine whether the desired value of intake-valve central angle θ is attained or reached. When the answer to step S21 is affirmative (YES), the routine returns from step S21 to step S11. Conversely when the answer to step S21 is negative (NO), the routine proceeds from step S21 to step S22.

At step S22, phase control actuator 20 is activated so that intake-valve central angle θ is brought closer to its desired value map-retrieved through step S16. That is, steps S21 and S22 are repeatedly executed until the desired intake-valve central angle is reached.

As will be appreciated from the above, according to the integrated combustion control system of the embodiment, it is possible to provide a very precise combustion control throughout engine/vehicle operating conditions by combining the variable piston stroke characteristic control (variable compression ratio ε control) with at least one of variable lift and working-angle θ control and variable intake-valve central angle φ control (variable intake-valve phase control). At part load conditions, the system of the embodiment enables effective compression ratio ε' to reduce by way of advancement of intake valve closure timing IVC, thus reducing the pumping loss (see FIG. 13D). On part load conditions (see idling condition ① and part load condition ② of FIG. 8), the system of the embodiment controls variable piston stroke characteristic mechanism 24 such that compression ratio ε becomes high (see FIG. 7), and additionally intake valve closure timing IVC is kept away from BDC and advanced before BDC and whereby effective compression ratio ε' is reduced. On the one hand, the increased compression ratio ensures good combustion. On the other hand, the reduced effective compression ratio ensures a reduction in pumping loss. When the predetermined knocking slice level is attained under high engine load conditions, the system of the embodiment operates to reduce compression ratio ε (FIGS. 9B and 11B) so that the reduced compression ratio prevents the engine from knocking. When the predetermined knocking slice level is attained under part load conditions that intake-valve working angle θ, defined as an angle between a crank angle at intake valve open timing IVO and a crank angle at intake valve closure timing IVC, has to be controlled to 180° or less, the system of the embodiment operates to phase-advance intake valve closure timing IVC (see FIG. 13E), and whereby effective compression ratio ε' is reduced, thus avoiding the engine from knocking. Furthermore, according to the system of the embodiment, intake valve closure timing IVC can be phase-advanced by way of at least one of a reduction in intake-valve working angle θ and a phase advance in intake-valve central angle φ. Moreover, when the predetermined knocking slice level is attained under high load conditions that intake-valve working angle θ has to be controlled to 180° or more, the system of the embodiment operates to phase-retard intake valve closure timing IVC (see the reduced intake valve central angle of FIG. 10E and see the IVC timing value (indicated by the broken line) with a large valve lift and a large working angle in the acceleration condition ③ of FIG. 8), and whereby effective compression ratio ε' is reduced, thus avoiding the engine from knocking. Additionally, according to the system of the embodiment, intake valve closure timing IVC can be phase-retarded by way of at least one of an extension in intake-valve working angle θ and a phase retard in intake-valve central angle φ. On the other hand, when the predetermined knocking slice level is attained under a condition (see accelerating condition ③ of FIG. 8) that intake-valve working angle θ has to be controlled to 180° or less and additionally the valve overlapping period during which intake and exhaust valves are at least partly open has to be controlled to a period greater than a predetermined period, the system of the embodiment operates to phase-retard intake-valve central angle φ, and whereby valve-overlap period O/L is shorten and as a result high-temperature residual gas is reduced, thus avoiding the engine from knocking. Additionally, just after the predetermined knocking slice level is attained, in order to instantaneously and more reliably avoid knocking, the system of the embodiment operates to retard the ignition timing by way of trace-knock control.

The entire contents of Japanese Patent Application No. P2001-7385 (filed Jan. 16, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A combustion control system for a spark-ignition internal combustion engine comprising:
    a variable piston stroke characteristic mechanism that changes a compression ratio of the engine;
    sensors that detect engine speed and engine load;
    at least one of a variable lift and working-angle control mechanism that simultaneously continuously changes a valve lift of an intake valve of the engine and a working angle of the intake valve and a variable phase control mechanism that changes an angular phase at a central angle corresponding to a maximum valve lift point of the intake valve, the working angle being defined as an angle between a crank angle at valve open timing of the intake valve and a crank angle at valve closure timing of the intake valve;
    a control unit being configured to be electronically connected to the variable piston stroke characteristic mechanism, the sensors, and the at least one of the variable lift and working-angle control mechanism and the variable phase control mechanism, for controlling the variable piston stroke characteristic mechanism, and the at least one of the variable lift and working-angle control mechanism and the variable phase control mechanism, depending on the engine speed and the engine load;
    a knock sensor that detects an intensity of knocking and generates a signal indicative of the intensity of knocking; and
    an ignition-timing control system that retards an ignition timing when a knocking condition is detected,
    wherein a compression ratio of the engine is reduced by the variable piston stroke characteristic mechanism when the signal from the knock sensor exceeds a predetermined slice level under a high load condition.

2. The combustion control system as claimed in claim 1, wherein the variable piston stroke characteristic mechanism comprises:
    an upper link connected at one end via a piston pin to a reciprocating piston;

a lower link linked to the other end of the upper link and linked to a crankpin of a crankshaft;

a control shaft extending substantially parallel to the crankshaft; a control link oscillatingly connected at one end to the control shaft and connected at the other end to the lower link, so that a center of oscillating motion of the control link is eccentric to a rotation center of the control shaft; and the piston stroke characteristic being changed by rotating the control shaft.

3. The combustion control system as claimed in claim 1, wherein the variable lift and working-angle control mechanism comprises:

a drive shaft rotatably supported by a cam bracket;

a first eccentric cam fixedly connected to the drive shaft and driven by the drive shaft;

a link arm fitted onto an outer periphery of the first eccentric cam and rotating relative to the first eccentric cam;

a control shaft rotatably supported by the cam bracket and arranged parallel to the drive shaft, and having a second eccentric cam;

a rocker arm rotatably supported on the second eccentric cam, an oscillating motion of the rocker arm being caused by the link arm;

a rockable cam rotatably supported on the drive shaft and being in abutted-engagement with a valve lifter of the intake valve;

a link member through which the rocker arm and the rockable cam are linked to each other, so that the valve lifter of the intake valve is pushed by an oscillating motion of the rockable cam, occurring due to the oscillating motion of the rocker arm; and the valve lift of the intake valve and the working angle of the intake valve are simultaneously continuously changed by changing an angular position of the second eccentric cam.

4. The combustion control system as claimed in claim 1, wherein the variable piston stroke characteristic mechanism is controlled so that a compression ratio becomes high under a part load condition; and wherein the valve closure timing of the intake valve is kept away from a bottom dead center and advanced before the bottom dead center, to reduce an effective compression ratio of the engine.

5. The combustion control system as claimed in claim 1, which further comprises:

a knock sensor that detects an intensity of knocking and generates a signal indicative of the intensity of knocking; and an ignition-timing control system that retards an ignition timing when a knocking condition is detected, wherein the valve closure timing of the intake valve is advanced when the signal from the knock sensor exceeds a predetermined slice level under a condition that the working angle of the intake valve has to be controlled to 180° or less.

6. The combustion control system as claimed in claim 5, wherein the valve closure timing of the intake valve is advanced by way of at least one of a reduction in the working angle of the intake valve and a phase advance in the central angle of the intake valve.

7. The combustion control system as claimed in claim 1, which further comprises:

a knock sensor that detects an intensity of knocking and generates a signal indicative of the intensity of knocking; and an ignition-timing control system that retards an ignition timing when a knocking condition is detected, wherein the valve closure timing of the intake valve is retarded when the signal from the knock sensor exceeds a predetermined slice level under a condition that the working angle of the intake valve has to be controlled to 180° or more.

8. The combustion control system as claimed in claim 7, wherein the valve closure timing of the intake valve is retarded by way of at least one of an extension in the working angle of the intake valve and a phase retard in the central angle of the intake valve.

9. The combustion control system as claimed in claim 1, which further comprises:

a knock sensor that detects an intensity of knocking and generates a signal indicative of the intensity of knocking; and an ignition-timing control system that retards an ignition timing when a knocking condition is detected, wherein the central angle of the intake valve is retarded when the signal from the knock sensor exceeds a predetermined slice level under a condition that the working angle of the intake valve has to be controlled to 180° or less and a valve overlap period, during which intake and exhaust valves are at least partly open, has to be controlled to a period greater than a predetermined period.

10. The combustion control system as claimed in claim 1, wherein the ignition timing is retarded by ignition-timing control system just after the signal from the knock sensor exceeds a predetermined slice level.

11. The combustion control system as claimed in claim 1, wherein the ignition timing is changed from a time when the signal from the knock sensor exceeds a predetermined slice level by way of trace-knock control that a change in the ignition timing is substantially inversely proportional to a change in a compression ratio of the engine during a full throttle condition, during an accelerating condition with a small valve overlap period, or during a part load condition with a small intake-pipe vacuum.

12. The combustion control system as claimed in claim 1, wherein the ignition timing is changed from a time when the signal from the knock sensor exceeds a predetermined slice level by way of trace-knock control that a change in the ignition timing is substantially inversely proportional to a change in the central angle of the intake valve during an accelerating condition with a large valve overlap period.

13. The combustion control system as claimed in claim 1, wherein the ignition timing is changed from a time when the signal from the knock sensor exceeds a predetermined slice level by way of trace-knock control that a change in the ignition timing is substantially inversely proportional to a change in the valve closure timing of the intake valve during a part load condition with a large intake-pipe vacuum.

14. An integrated combustion control system for a spark-ignition internal combustion engine comprising:

variable piston stroke characteristic means for changing a compression ratio of the engine;

sensor means for detecting engine speed and engine load;

at least one of variable lift and working-angle control means for simultaneously continuously changing a valve lift of an intake valve of the engine and a working angle of the intake valve and variable phase control means for changing an angular phase at a central angle corresponding to a maximum valve lift point of the intake valve; the working angle being defined as an angle between a crank angle at valve open timing of the intake valve and a crank angle at valve closure timing of the intake valve;

control means being configured to be electronically connected to the variable piston stroke characteristic means, the sensor means, and the at least one of the variable lift and working-angle control means and the variable phase control means, for controlling the variable piston stroke characteristic means, and the at least one of the variable lift and working-angle control means and the variable phase control means, depending on the engine speed and the engine load;

a knock sensor that detects an intensity of knocking and generates a signal indicative of the intensity of knocking; and an ignition-timing control system that retards an ignition timing when a knocking condition is detected, wherein a compression ratio of the engine is reduced by the variable piston stroke characteristic mechanism when the signal from the knock sensor exceeds a predetermined slice level under a high load condition.

15. A method for controlling combustion of a spark-ignition internal combustion engine employing a variable piston stroke characteristic mechanism that changes a compression ratio of the engine, a variable lift and working-angle control mechanism that simultaneously continuously changes a valve lift of an intake valve of the engine and a working angle of the intake valve so that the valve lift increases as the working angle increases, and a variable phase control mechanism that changes an angular phase at a central angle corresponding to a maximum valve lift point of the intake valve, the working angle being defined as an angle between a crank angle at valve open timing of the intake valve and a crank angle at valve closure timing of the intake valve, the method comprising:

detecting an intensity of knocking and generating a signal indicative of the intensity of knocking;

detecting engine operating conditions including both engine speed and engine load;

retrieving a desired working angle, a desired central angle and a desired compression ratio from a predetermined priority control map showing how the working angle, the central angle, and the compression ratio have to be varied relative to the engine operating conditions;

controlling the working angle so that an actual working angel is brought closer to the desired working angle;

controlling the central angle so that an actual central angle is brought closer to the desired central angle;

controlling the compression ratio so that an actual compression ratio is brought closer to the desired compression ratio;

controlling an ignition timing from a time when the signal from the knock sensor exceeds a predetermined slice level by way of trace-knock control that a change in the ignition timing is substantially inversely proportional to a change in the compression ratio during a full throttle condition, during an accelerating condition with a small valve overlap period, or during a part load condition with a small intake-pipe vacuum;

controlling the ignition timing from the time when the signal from the knock sensor exceeds the predetermined slice level by way of trace-knock control that a change in the ignition timing is substantially inversely proportional to a change in the central angle during an accelerating condition with a large valve overlap period; and controlling the ignition timing from the time when the signal from the knock sensor exceeds the predetermined slice level by way of trace-knock control that a change in the ignition timing is substantially inversely proportional to a change in the valve closure timing during a part load condition with a intake-pipe vacuum.

16. A combustion control system for a spark-ignition internal combustion engine comprising:

a variable piston stroke characteristic (VPSC) mechanism that changes a compression ratio of the engine;

sensors that detect engine speed and engine load;

a control unit being configured to be electronically connected to the variable piston stroke characteristic mechanism and the sensors, for controlling the variable piston stroke characteristic mechanism depending on the engine speed and the engine load;

a knock sensor that detects an intensity of knocking and generates a signal indicative of the intensity of knocking;

an ignition-timing control system that retards an ignition timing when a knocking condition is detected;

a variable lift and working angle control (VLWAC) mechanism that simultaneously continuously changes a valve lift of an intake valve and a working angle of the intake valve; and a variable phase control (VPC) mechanism that changes an angular phase at a central angle corresponding to a maximum valve lift point of the intake valve, wherein the compression ratio of the engine is reduced by the variable piston stroke characteristic mechanism when the signal from the knock sensor exceeds a predetermined slice level under a high load condition, wherein the control unit is configured to be further connected to the variable lift and working angle control mechanism and the variable phase control mechanism, for selectively controlling the VPSC, VLWAC, and VPC mechanisms depending on the engine speed and the engine load, and wherein the control unit comprises a processor programmed to perform the following,
  (a) determining, based on the engine speed and the engine load, which of the VPSC, VLWAC, and VPC mechanisms should be controlled, taking into account of a knocking-avoidance control response of each of the VPSC, VLWAC, and VPC mechanisms; and
  (b) selectively controlling either one of the VPSC, VLWAC, and VPC mechanisms, responsively to input information regarding which of the VPSC, VLWAC, and VPC mechanisms should be controlled under a current engine operation condition including the engine speed and the engine load.

17. A combustion control system for a spark-ignition internal combustion engine comprising:

a variable piston stroke characteristic (VPSC) mechanism that changes a compression ratio of the engine;

sensors that detect engine speed and engine load;

a control unit being configured to be electronically connected to the variable piston stroke characteristic mechanism and the sensors, for controlling the variable piston stroke characteristic mechanism depending on the engine speed and the engine load;

a knock sensor that detects an intensity of knocking and generates a signal indicative of the intensity of knocking;

an ignition-timing control system that retards an ignition timing when a knocking condition is detected; and a variable lift and working angle control (VLWAC) mechanism that simultaneously continuously changes a valve lift of an intake valve and a working angle of the intake valve, wherein the compression ratio of the engine is reduced by the variable piston stroke characteristic mechanism when the signal from the knock sensor exceeds a predetermined slice level under a high load condition, wherein the control unit is configured to be further connected to the variable lift and working angle control mechanism, for selectively controlling the VPSC and VLWAC mechanisms depending on the engine speed and the engine load, and wherein the control unit comprises a processor programmed to perform the following,
  (a) determining, based on the engine speed and the engine load, which of the VPSC and VLWAC mechanisms should be controlled, taking into account of a knocking-avoidance control response of each of the VPSC and VLWAC mechanisms; and
  (b) selectively controlling either one of the VPSC and VLWAC mechanisms, responsively to input information regarding which of the VPSC and VLWAC mechanisms should be controlled under a current engine operation condition including the engine speed and the engine load.

18. A combustion control system for a spark-ignition internal combustion engine comprising:

a variable piston stroke characteristic (VPSC) mechanism that changes a compression ratio of the engine;

a variable lift and working angle control (VLWAC) mechanism that simultaneously continuously changes a valve lift of an intake valve and a working angle of the intake valve;

sensors that detect engine speed and engine load;

a control unit being configured to be electronically connected to the VPSC and VLWAC mechanisms and the sensors, for selectively controlling the VPSC and VLWAC mechanism depending on the engine speed and the engine load, wherein the control unit comprises a processor programmed to perform the following,
  (a) determining, based on the engine speed and the engine load, which of the VPSC and VLWAC mechanisms should be controlled; and
  (b) selectively controlling either one of the VPSC and VLWAC mechanisms, responsively to input information regarding which of the VPSC and VLWAC mechanisms should be controlled under a current engine operation condition including the engine speed and the engine load.

19. The combustion control system as claimed in claim 18, wherein an effective compression ratio of the engine is reduced by changing an intake valve closure timing by the variable lift and working angle control mechanism under a part load condition.

* * * * *